United States Patent [19]

Kubo

[11] Patent Number: 4,669,045

[45] Date of Patent: May 26, 1987

[54] METHOD AND SYSTEM FOR DERIVING WHEEL ACCELERATION AND DECELERATION IN AUTOMOTIVE ANTI-SKID BRAKE CONTROL SYSTEMS

[75] Inventor: Jun Kubo, Hino, Japan

[73] Assignee: Nissan Motor Company, Limited, Yokohama, Japan

[21] Appl. No.: 601,345

[22] Filed: Apr. 17, 1984

[30] Foreign Application Priority Data

May 16, 1983 [JP] Japan .................................. 58-84085

[51] Int. Cl.[4] .............................................. B60T 8/34
[52] U.S. Cl. .................................... 364/426; 364/566; 324/162; 303/105
[58] Field of Search ................ 364/426, 566; 324/162; 303/95, 105–108; 361/238

[56] References Cited

U.S. PATENT DOCUMENTS

| | | | |
|---|---|---|---|
| 2,914,359 | 11/1959 | Yarber | 303/24 B |
| 3,398,995 | 8/1968 | Martin | 303/105 |
| 3,503,653 | 3/1970 | Davis et al. | 303/95 |
| 3,637,264 | 1/1972 | Leiber et al. | 303/105 |
| 3,752,536 | 8/1973 | Machek | 303/115 |
| 3,930,688 | 1/1976 | Rau et al. | 364/426 |
| 3,938,612 | 2/1976 | Boudeville et al. | 364/426 |
| 3,943,345 | 3/1976 | Ando et al. | 364/566 |
| 3,985,396 | 10/1976 | Kuwana et al. | 364/426 |
| 4,267,575 | 5/1981 | Bounds | 364/565 |
| 4,315,213 | 2/1982 | Wolff | 364/565 |
| 4,320,459 | 3/1982 | Lindemann et al. | 303/105 |
| 4,335,431 | 6/1982 | Takahashi | 303/95 |
| 4,398,260 | 8/1983 | Takahashi et al. | 364/426 |
| 4,408,290 | 10/1983 | Kubo et al. | 364/566 |
| 4,446,522 | 5/1984 | Sato et al. | 364/426 |
| 4,569,560 | 2/1986 | Kubo | 303/92 |

*Primary Examiner*—Gary Chin
*Attorney, Agent, or Firm*—Schwartz, Jeffery, Schwaab, Mack, Blumenthal & Evans

[57] ABSTRACT

In an anti-skid brake control system, wheel acceleration or deceleration is calculated at a different timing than the calculation of the wheel speed and a control signal. The intervals between calculations of wheel acceleration and deceleration will often be longer than those of the control signal. Wheel acceleration and deceleration values in the intervals between calculations are extrapolated on the basis of the rate of change derived from the difference between two successively derived wheel acceleration and deceleration values and elapsed time since the last derivation. The extrapolating value is used as a replacement for the most recently derived wheel acceleration in deriving the control signal.

14 Claims, 24 Drawing Figures

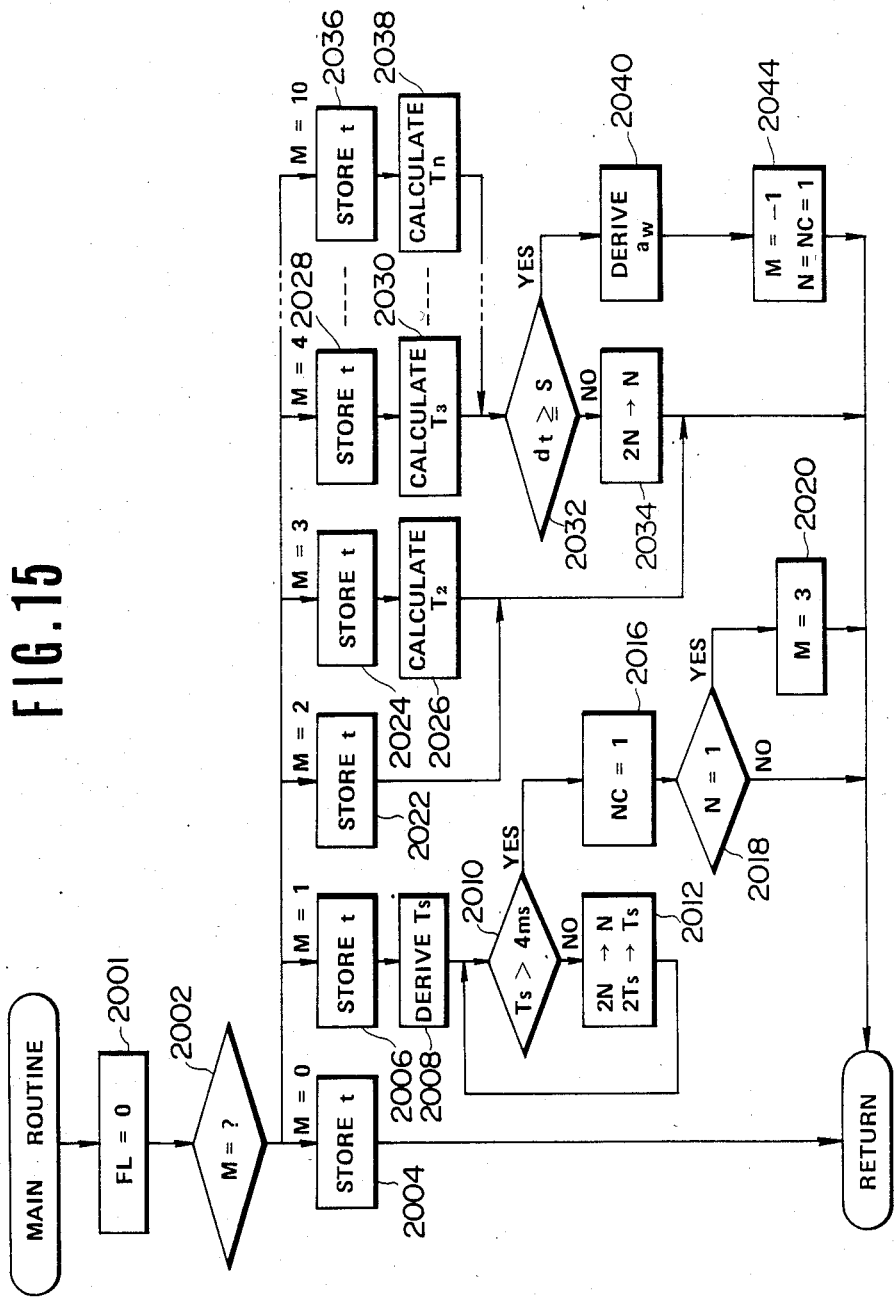

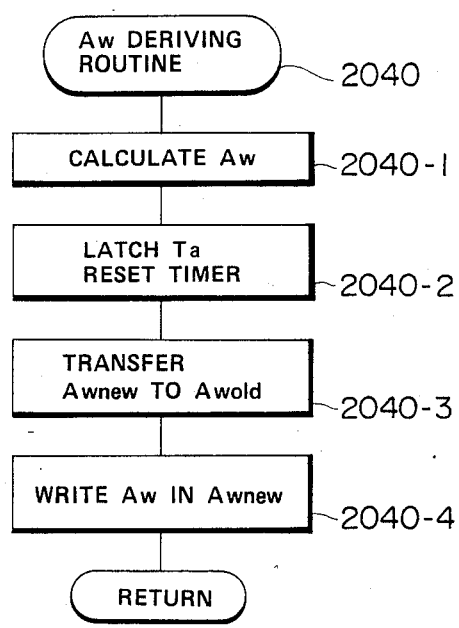
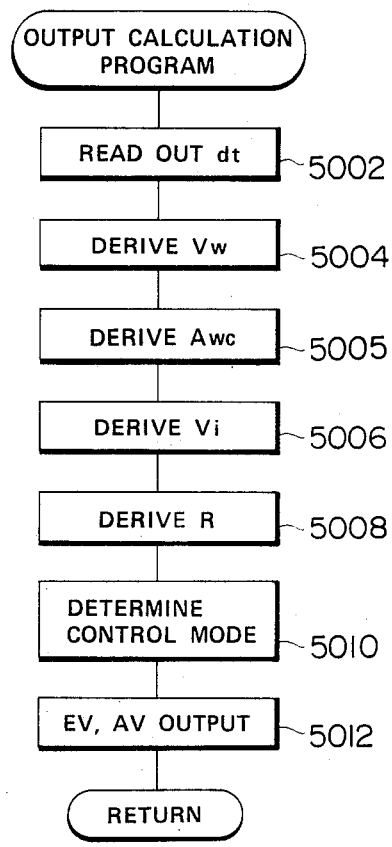
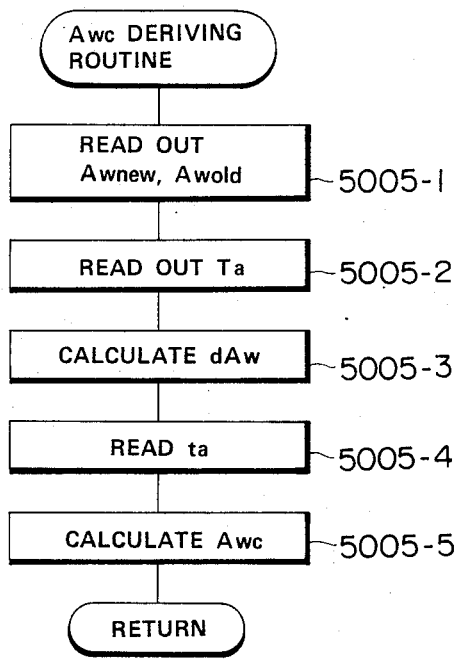

METHOD AND SYSTEM FOR DERIVING WHEEL ACCELERATION AND DECELERATION IN AUTOMOTIVE ANTI-SKID BRAKE CONTROL SYSTEMS

BACKGROUND OF THE INVENTION

The present invention relates generally to an anti-skid brake control system in which wheel acceleration is derived in order to detect braking conditions as part of braking control. More particularly, the invention relates to a method and system for deriving wheel acceleration which compensates for time lag in the derivation of wheel acceleration and deceleration.

In general, wheel slippage during braking is best maintained in a predetermined range so that skidding or locking of the wheels can be reliably prevented and that the braking characteristics of the vehicle can be optimized. As is well known, in anti-skid control, the braking pressure to be applied to wheel cylinders is to be so adjusted that the peripheral speed of the wheels during braking is held to a given range, e.g. 80%, of the vehicle. Such practice has been believed to be effective especially when road conditions and other factors are taken into consideration. Through out the accompanied disclosure, the ratio of wheel peripheral speed to vehicle speed will be referred to as "slip rate" or "slip ratio".

In the anti-skid control, working fluid pressure in a wheel cylinder in a hydraulic brake circuit is associated with a pressure control valve which is operative in an application mode for increasing the fluid pressure in the wheel cylinder, in an releasing mode for decreasing the fluid pressure in the wheel cylinder and in a holding mode for holding the fluid pressure in the wheel cylinder at a substantially constant level. One of the foregoing operational mode is selected depending upon the braking condition derived based on a wheel speed, a wheel acceleration, a slip rate and so forth.

In U.S. Pat. No. 4,408,290, issued on Oct. 4, 1983 to the common inventor and commonly assigned to a common assignee, discloses a method and system for sampling input time data for use in calculation of acceleration and deceleration. In the disclosure of the applicant's prior invention, an acceleration sensor acts on the variable-frequency pulses of a speed sensor signal to recognize any variation of the pulse period thereof and to produce an output indicative of the magnitude of the detected variation to within a fixed degree of accuracy. The durations of groups of pulses are held to within a fixed range by adjusting the number of pulses in each group. The duration of groups of pulses are measured with reference to a fixed-frequency clock pulse signal and the measurement periods of successive groups of equal numbers of pulses are compared. If the difference between pulse group periods is zero or less than a predetermined value, the number of pulses in each group is increased in order to increase the total number of clock pulses during the measurement interval. The number of pulses per group is increased until the difference between measured periods exceeds the predetermined value or until the number of pulses per group reaches a predetermined maximum. Acceleration data calculation and memory control procedure are designed to take into account the variation of the number of pulse per group.

The wheel speed is calculated periodically after the pulse interval or duration of the grouped sensor pulses becomes greater than a predetermined value. A slip rate is periodically derived from the derived wheel speed. On the other hand, the wheel acceleration is calculated only when the difference between the sensor pulse intervals or the durations of successive sensor pulse groups becomes larger than a given value. Therefore, wheel acceleration may be derived later than the wheel speed and the slip rate. Since the operation mode is derived periodically corresponding to calculation timing of the wheel speed and slip rate, the delay in deriving the wheel acceleration value can cause errors in selecting the operation mode.

In particularly significant cases, one of the operational modes in a predetermined skid control pattern may be skipped, i.e. not performed during one cycle of the skid control operation. For example, it is possible for the holding mode to be selected immediately after having selected the holding mode, i.e. to skip either a release mode or an application mode. In such case, if it is an application mode which is skipped, and thus the fluid pressure in the wheel cylinder is held at a reduced value, wheel speed will increase non-optimally, resulting in an unnecessarily prolonged braking distance. On the other hand, if a release mode period is skipped, the fluid pressure in the wheel cylinder will be held at an excessively high value, increasing the slip rate non-optimally, which may result in a skid.

Such danger is caused when one period of a scheduled operational mode cycle is skipped.

SUMMARY OF THE INVENTION

Therefore, it is an object of the present invention to provide an anti-skid brake control system which can compensate for significant changes in an arithmetically derived wheel acceleration value due to time lags in the arithmetic operations.

Another and more specific object of the invention is to provide a method and system for deriving wheel acceleration and deceleration in which extrapolation based on the last two derived wheel acceleration values is performed to obtain wheel acceleration and deceleration values which are variable in a stepwise fashion in order to avoid significant changes in the derived values.

In order to accomplish the above-mentioned and other objects, a method for deriving wheel acceleration and deceleration performs extrapolation calculations in order to project the instantaneous wheel acceleration value. The rate of change of the wheel acceleration and deceleration is derived as part of the extrapolation operation from the new wheel acceleration value derived in the current cycle of an arithmetic operation and an old wheel acceleration and deceleration value derived in the immediately preceeding cycle of the arithmetic operation, and from the interval between the derivations of the new and old wheel acceleration values.

BRIEF DESCRIPTION OF THE DRAWINGS

The present invention will be understood more fully from the detailed description given below and from the accompanying drawings of the preferred embodiments of the present invention, which, however, should not be taken to limit the invention to the specific embodiments, but are for explanation and understanding only.

FIG. 15 is a flowchart of a main routine in the main program of FIG. 13;

FIG. 16 is a flowchart of a wheel acceleration and deceleration calculation routine in the main routine in FIG. 15;

FIG. 17 is a flowchart of an output calculation program as an interrupt program for the main program;

FIG. 18 is a flowchart of an extrapolated value deriving routine in the output calculation program of FIG. 19;

DESCRIPTION OF THE PREFERRED EMBODIMENTS

Figure 1:
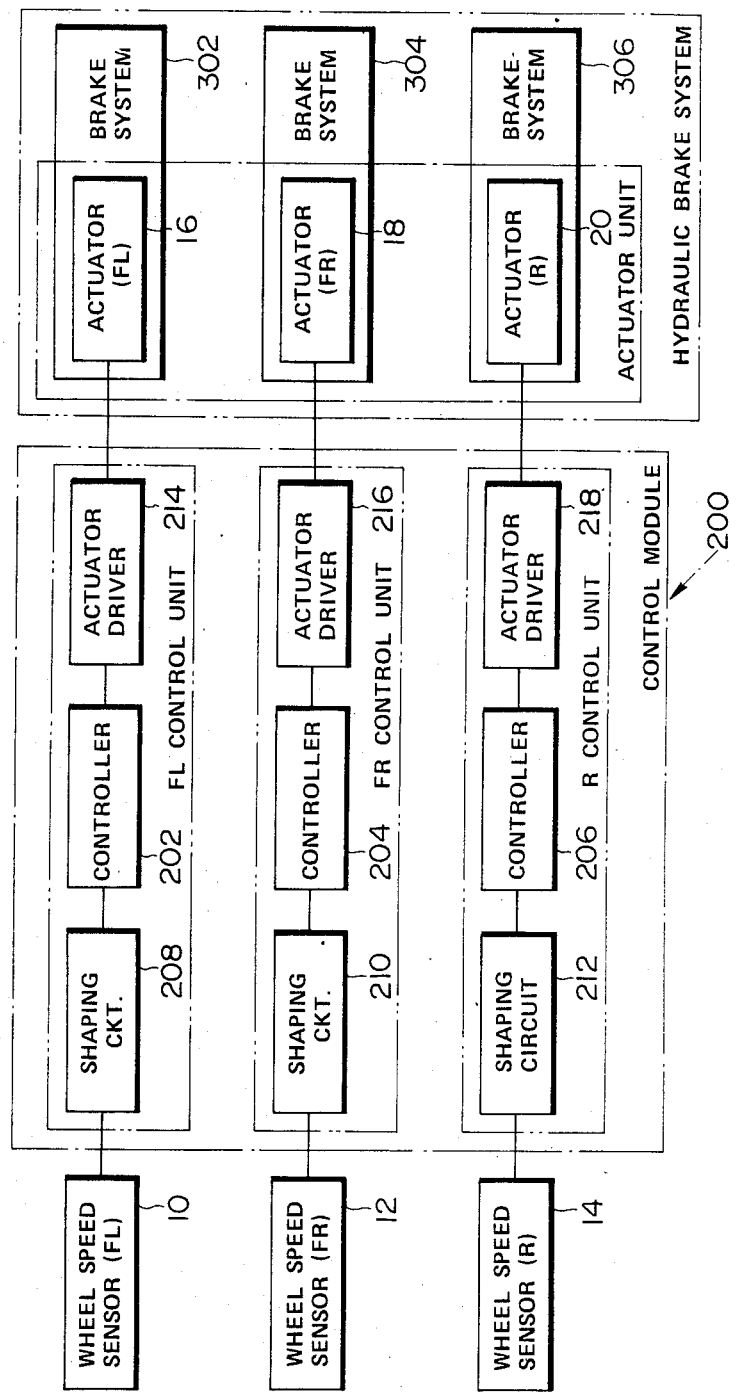
FIG. 1 is a schematic step diagram of the general design of the preferred embodiment of an anti-skid brake control system according to the present invention.

This application is one of eighteen mutually related co-pending patent applications in the United States, filed on the same day. All of the eighteen applications have been filed by the common applicant to this application and commonly assigned to the assignee of this application. The other seventeen applications are identified below:

| Basic Japanese Patent Appln. No. | Serial No. | Title of the Invention |
|---|---|---|
| Showa 58-70891 | 601,326, filed April 17, 1984 | AN AUTOMOTIVE ANTI-SKID BRAKE CONTROL SYSTEM WITH SAMPLING INPUT TIME DATA OF WHEEL SPEED SENSOR SIGNALS |
| Showa 58-70892 (filed April 23, 1983) | 601,375, filed April 17, 1984 | METHOD AND SYSTEM FOR SAMPLING INPUT TIME DATA FOR WHEEL SPEED SENSOR IN AN AUTOMOTIVE ANTI-SKID BRAKE CONTROL SYSTEM |
| Showa 58-70893 (filed April 23, 1983) | 601,325, filed April 17, 1984 | AUTOMOTIVE ANTI-SKID CONTROL SYSTEM WITH CONTROL OF SAMPLING OF INPUT TIME DATA OF WHEEL SPEED SENSOR SIGNALES AND METHOD THEREFOR |
| Showa 58-70894 (filed April 23, 1983) | 601,317, filed April 17, 1984 | ANTI-SKID CONTROL SYSTEM FOR AUTOMOTIVE BRAKE SYSTEM WITH SAMPLE CONTROL FOR SAMPLING INPUT TIMING OF SENSOR SIGNAL PULSES WITH REQUIRED PROCESS IDENTIFICATION AND METHOD FOR SAMPLING |
| Showa 58-70895 (filed April 23, 1983) | 601,294, filed April 17, 1984 | ANTI-SKID BRAKE CONTROL SYSTEM INCLUDING A PROCEDURE OF SAMPLING OF INPUT TIME DATA OF WHEEL SPEED SENSOR SIGNALS |

-continued

| Basic Japanese Patent Appln. No. | Serial No. | Title of the Invention |
|---|---|---|
| | | AND METHOD THEREFOR |
| Showa 58-70896 (filed April 23, 1983) | 601,344, filed April 17, 1984 | ANTI-SKID BRAKE CONTROL SYSTEM INCLUDING WHEEL DECELERATION CALCULATION WITH SHORTER LAG-TIME AND METHOD FOR PERFORMING CALCULATION |
| Showa 58-70897 (filed April 23, 1983) | 601,338, filed April 17, 1984 | ANTI-SKID BRAKE CONTROL SYSTEM WITH SAMPLE CONTROL OF SENSOR SIGNAL INPUT TIME DATA, AND METHOD THEREFOR |
| Showa 58-70898 (filed April 23, 1983) | 601,337, filed April 17, 1984 | ANTI-SKID BRAKE CONTROL SYSTEM WITH CONTROL OF SAMPLING TIMING OF INPUT TIMING VALUES OF WHEEL SPEED SENSOR SIGNAL PULSES |
| Showa 58-70899 (filed April 23, 1983) | 601,330, filed April 17, 1984 | ANTI-SKID BRAKE CONTROL SYSTEM FOR AUTOMOTIVE VEHICLE |
| Showa 58-70900 (filed April 23, 1983) | 601,364, filed April 17, 1984 | ANTI-SKID BRAKE CONTROL SYSTEM WITH REDUCED DURATION OF WHEEL ACCELERATION AND DECELERATION CALCULATION |
| Showa 58-84088 (filed May, 16 1983) | 601,363, filed April 17, 1984 | ANTI-SKID BRAKE CONTROL SYSTEM WITH OPERATIONAL MODE CONTROL AND METHOD THEREFOR |
| Showa 58-84087 & 58-84091 (both filed May 16, 1983) | 601,329, filed April 17, 1984 | ANTI-SKID BRAKE CONTROL SYSTEM WITH OPERATION CONTROL FOR A PRESSURE REDUCTION FLUID PUMP IN HYDRAULIC BRAKE CIRCUIT |
| Showa 58-84082 (filed May 16, 1983) | 601,318, filed April 17, 1986 | METHOD AND SYSTEM FOR DERIVING WHEEL ROTATION SPEED DATA FOR AUTOMOTIVE ANTI-SKID CONTROL |
| Showa 58-84092 (filed May, 16 1983) | 601,293, filed April 17, 1984 | ANTI-SKID BRAKE CONTROL SYSTEM AND METHOD FEATURING VEHICLE BATTERY PROTECTION |
| Showa 58-84081 (filed May, 16 1983) | 601,317, filed April 17, 1984 | METHOD AND SYSTEM FOR DERIVING WHEEL ROTATION SPEED DATA FOR AUTOMOTIVE ANTI-SKID CONTROL |
| Showa 58-84090 (filed May, 16 1983) | 601,258, filed April 17, 1984, now Patent No. 4,569,560 issued February 11, 1986 | ANTI-SKID BRAKE CONTROL SYSTEM INCLUDING FLUID PUMP AND DRIVE CIRCUIT THEREFOR |
| Showa 58-102919 & 58-109308 (respectively filed June 10, 1983 & June 20, 1983) | 601,295, filed April 17, 1984 | ANTI-SKID BRAKE CONTROL SYSTEM WITH A PLURALITY OF INDEPENDENTLY OPERATIVE DIGITAL CONTROLLERS |

Disclosures of other seventeen applications as identified above are hereby incorporated by reference for the sake of disclosure.

Referring now to the drawings, particularly to FIG. 1, the preferred embodiment of an anti-skid control system according to the present invention includes a control module 200 including a front-left controller unit (FL) 202, a front-right controller unit (FR) 204 and a rear controller unit (R) 206. The controller unit 202 comprises a microprocessor and is adapted to control brake pressure applied to a front left wheel cylinder 30a of a front left hydraulic brake system 302 of an automotive hydraulic brake system 300. Similarly, the controller unit 204 is adapted to control brake pressure applied to the wheel cylinder 34a of a front right wheel (not shown) in the front right hydraulic brake system 304 and the controller unit 206 is adapted to control brake pressure applied to the rear wheel cylinders 38a of the hydraulic rear brake system 306. Respective brake systems 302, 304 and 306 have electromagnetically operated actuators 16, 18 and 20, each of which controls the pressure of working fluid in the corresponding wheel cylinders. By means of the controlled pressure, the wheel cylinders 30a, 34a and 38a apply braking force to brake disc rotors 28, 32 and 36 mounted on the corresponding wheel axles for rotation with the corresponding vehicle wheels via brake shoe assemblies 30, 34 and 38.

Though the disclosed brake system comprises disc brakes, the anti-skid control system according to the present invention can also be applied to drum-type brake systems.

The controller units 202, 204 and 206 are respectively associated with actuator drive circuits 214, 216 and 218 to control operations of corresponding actuators 16, 18 and 20. In addition, each of the controller units 202, 204 and 206 is connected to a corresponding wheel speed sensor 10, 12 and 14 via shaping circuits 208, 210 and 212 incorporated in the controller 200. Each of the wheel speed sensors 10, 12 and 14 is adapted to produce an alternating-current sensor signal having a frequency related to or proportional to the rotation speed of the corresponding vehicle wheel. Each of the A-C sensor signals is converted by the corresponding shaping circuit 208, 210 and 212 into a rectangular pulse signal which will be hereafter referred to as "sensor pulse signal". As can be appreciated, since the frequency of the A-C sensor signals is proportional to the wheel speed, the frequency of the sensor pulse signal should correspond to the wheel rotation speed and the pulse intervals thereof will be inversely proportional to the wheel rotation speed.

The controller units 202, 204 and 206 operate independently and continuously process the sensor pulse signal to derive control signals for controlling the fluid pressure in each of the wheel cylinders 30a, 34a and 38a in such a way that the slip rate R at each of the vehicle wheels is optimized to shorten the distance required to stop the vehicle, which distance will be hereafter referred to as "braking distance".

In general, each controller unit 202, 204 and 206 monitors receipt of the corresponding sensor pulses so that it can derive the pulse interval between the times of receipt of successive sensor pulses. Based on the derived pulse interval, the controller units 202, 204 and 206 calculate instantaneous wheel speed $V_w$ and instantaneous wheel acceleration or deceleration $a_w$. From these measured and derived values, a target wheel speed $V_i$ is derived, which is an assumed value derived from the wheel speed at which a slip is assumed to be zero or approximately zero. The target wheel speed $V_i$ varies at a constant decelerating rate derived from variation of the wheel speed. The target wheel speed thus corresponds to a vehicle speed which itself is based on variations of the wheel speed. Based on the difference between the instantaneous wheel speed $V_w$ and the target wheel speed $V_i$, a slip rate R is derived. The controller units 202, 204 and 206 determine the appropriate operational mode for increasing, decreasing or holding the hydraulic brake pressure applied to the wheel cylinders 30a, 34a and 38a. The control mode in which the brake pressure is increased will be hereafter referred to as "application mode". The control mode in which the brake pressure is decreased will be hereafter referred to as "release mode". The mode in which the brake pressure is held essentially constant will be hereafter referred to as "hold mode". The anti-skid control operation consists of a loop of the application mode, hold mode, release mode and hold mode. This loop is repeated throughout the anti-skid brake control operation cyclically. One cycle of the loop of the control variation will be hereafter referred to as "skid cycle".

Figure 2:
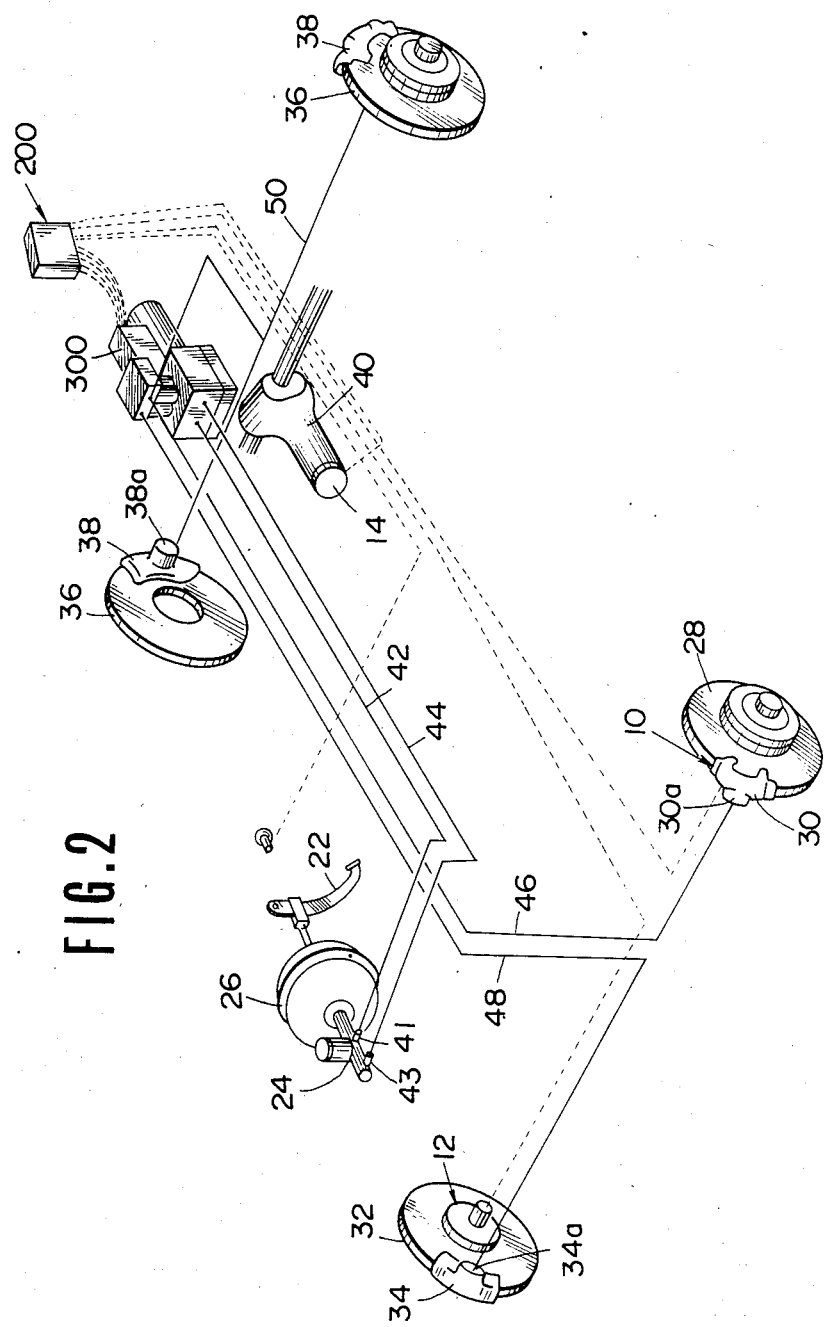
FIG. 2 is a perspective illustration of the hydraulic circuits of the anti-skid brake system according to the present invention.

FIG. 2 shows portions of the hydraulic brake system of an automotive vehicle to which the preferred embodiment of the anti-skid control system is applied. The wheel speed sensors 10 and 12 are respectively provided adjacent the brake disc rotor 28 and 32 for rotation therewith so as to produce sensor signals having frequencies proportional to the wheel rotation speed and variable in accordance with variation of the wheel speed. On the other hand, the wheel speed sensor 14 is provided adjacent a propeller shaft near the differential gear box or drive pinion shaft 16 for rotation therewith. Since the rotation speeds of the left and right rear wheels are free to vary independently depending upon driving conditions due to the effect of the differential gear box 40, the rear wheel speed detected by the rear wheel speed sensor 14 is the average of the speeds of the left and right wheels. Throughout the specification, "rear wheel speed" will mean the average rotation speed of the left and right rear wheels.

As shown in FIG. 2, the actuator unit 300 is connected to a master wheel cylinder 24 via primary and secondary outlet ports 41 and 43 thereof and via pressure lines 44 and 42. The master wheel cylinder 24 is, in turn, associated with a brake pedal 22 via a power booster 26 which is adapted to boost the braking force applied to the brake pedal 22 before applying same to the master cylinder. The actuator unit 300 is also connected to wheel cylinders 30a, 34a and 38a via brake pressure lines 46, 48 and 50.

Figure 3:
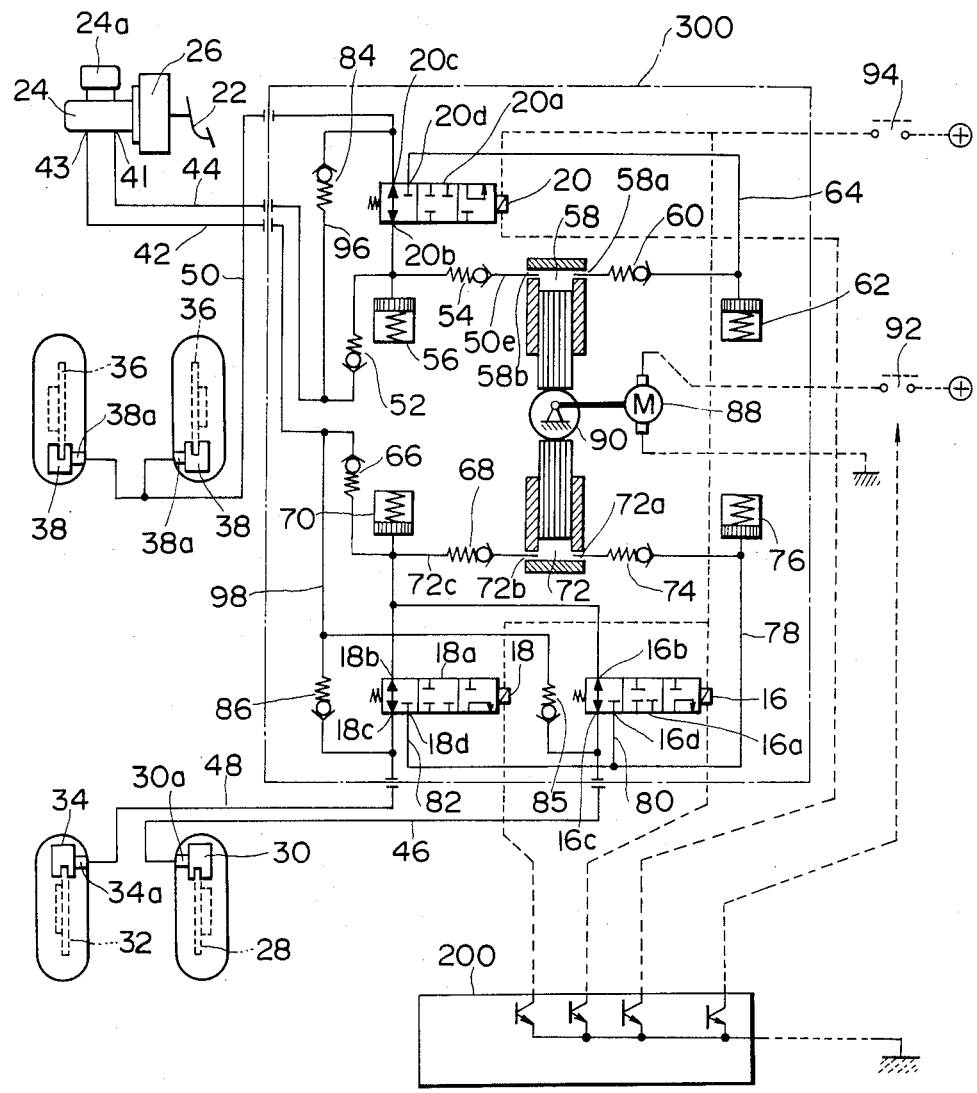
FIG. 3 is a circuit diagram of the hydraulic circuits performing the anti-skid control according to the present invention.

The circuit lay-out of the hydraulic brake system circuit will be described in detail below with reference to FIG. 3 which is only an example of the hydraulic brake system to which the preferred embodiment of the anti-skid control system according to the present invention can be applied, and so it should be appreciated that it is not intended to limit the hydraulic system to the embodiment shown. In FIG. 3, the secondary outlet port 43 is connected to the inlet ports 16b and 18b of electromagnetic flow control valves 16a and 18a, the respective outlet ports 16c and 18c of which are connected to corresponding left and right wheel cylinders 30a and 34a, via the secondary pressure lines 46 and 48. The primary outlet port 41 is connected to the inlet port 20b of the electromagnetic valve 20a, the outlet port 20c of which is connected to the rear wheel cylinders 38a, via a primary pressure line 50. The electromagnetic valves 16a, 18a and 20a also have drain ports 16d, 18d and 20d. The drain ports 16d and 18d are connected to the inlet port 72a of a fluid pump 90 via drain passages 80, 82 and 78. The fluid pump 90 is associated with an electric motor 88 to be driven by the latter which is, in turn, connected to a motor relay 92, the duty cycle of which is controlled by means of a control signal from the control module 200. While the motor relay 92 is energized to be turned ON, the motor 88 is in operation to drive the fluid pump 90. The drain port 20d of the electromagnetic flow control valve 20a is connected to the inlet port 58a of the fluid pump 90 via a drain passage 64.

The outlet ports 72b and 58b are respectively connected to the pressure lines 42 and 44 via a return passages 72c and 58c. The outlet ports 16c, 18c and 20c of respective electromagnetic flow control valves 16a, 18a and 20a are connected to corresponding wheel cylinders 30a, 34a and 38a via braking lines 46, 48 and 50. Bypass passages 96 and 98 are provided to connect the braking pressure lines 46 and 48, and 50 respectively to the pressure lines 42 and 44, bypassing the electromagnetic flow control valves.

Pump pressure check valves 52 and 66 are installed in the pressure lines 42 and 44. Each of the pump pressure valves 66 and 52 is adapted to prevent the working fluid pressurized by the fluid pump 90 from transmitting pressure surges to the master cylinder 24. Since the fluid pump 90 is designed for quick release of the braking pressure in the braking pressure lines 46, 48 and 50 and thus releasing the wheel cylinders 30a, 34a and 38a from the braking pressure, it is driven upon release of the brake pedal. This would result in pressure surges in the working fluid from the fluid pump 90 to the master cylinder 24 if the pump pressure check valves 66 and 52 were not provided. The pump pressure check valves 66 and 52 serve as one-way check valves allowing fluid flow from the master cylinder 24 to the inlet ports 16b, 18b and 20b of the electromagnetic valves 16a, 18a and 20a. Pressure accumulators 70 and 56 are installed in the pressure lines 42 and 44, which pressure accumulators serve to accumulate fluid pressure generated at the outlet ports 72b and 58b of the fluid pump 90 while the inlet ports 16b, 18b and 20b are closed. Toward this end, the pressure accumulators 70 and 56 are connected to the outlet ports 72b and 58b of the fluid pump 90 via the return passages 72c and 58c. Outlet valves 68 and 54 are one-way check valves allowing one-way fluid communication from the fluid pump to the pressure accumulators. These outlet valves 68 and 54 are effective for preventing the pressure accumulated in the pressure accumulators 70 and 56 from surging to the fluid pump when the pump is deactivated. In addition, the outlet valves 68 and 54 are also effective to prevent the pressurized fluid flowing through the pressure lines 42 and 44 from flowing into the fluid pump 90 through the return passages 72c and 58c.

Inlet check valves 74 and 60 are inserted in the drain passages 78 and 64 for preventing surge flow of the pressurized fluid in the fluid pump 90 to the electromagnetic flow control valves 16a, 18a and 20a after the braking pressure in the wheel cylinders is released. The fluid flowing through the drain passages 78 and 64 is temporarily retained in fluid reservoirs 76 and 62 connected to the former.

Bypass check valves 85, 86 and 84 are inserted in the bypass passages 98 and 96 for preventing the fluid in the pressure lines 42 and 44 from flowing to the braking pressure lines 46, 48 and 50 without first passing through the electromagnetic flow control valves 16a, 18a and 20a. On the other hand, the bypass valves valves 85, 86 and 84 are adapted to permit fluid flow from the braking pressure line 46, 48 and 50 to the pressure lines 42 and 44 when the master cylinder 24 is released and thus the line pressure in the pressure lines 42 and 44 becomes lower than the pressure in the braking pressure lines 46, 48 and 50.

The electromagnetic flow control valves 16a, 18a and 20a are respectively associated with the actuators 16, 18 and 20 to be controlled by means of the control signals from the control module 200. The actuators 16, 18 and 20 are all connected to the control module 200 via an actuator relay 94, which thus controls the energization and deenergization of them all. Operation of the electromagnetic valve 16a in cooperation with the actuator 16 will be illustrated with reference to FIGS. 4, 5 and 6, in particular illustrating the application mode, hold mode and release mode, respectively.

It should be appreciated that the operation of the electromagnetic valves 18a and 20a are substantially the same as that of the valve 16a. Therefore, disclosure of the valve operations of the electromagnetic valves 18a and 20a is omitted in order to avoid unnecessary repetition and for simplification of the disclosure.

APPLICATION MODE

In this position, the actuator 16 remains deenergized. An anchor of the electromagnetic valve 16a thus remains in its initial position allowing fluid flow between the inlet port 16b and the outlet port 16c so that the pressurized fluid supplied from the master cylinder 24 via the pressure line 42 may flow to the left front wheel cylinder 30a via the braking pressure line 46. In this valve position, the drain port 16d is closed to step fluid flow from the pressure line 42 to the drain passage 78. As a result, the line pressure in the braking pressure line 46 is increased in proportion to the magnitude of depression of the brake pedal 22 and thereby the fluid pressure in the left front wheel cylinder 30a is increased correspondingly.

In this case, when the braking force applied to the brake pedal is released, the line pressure in the pressure line 42 drops due to return of the master cylinder 24 to its initial position. As a result, the line pressure in the braking pressure line 46 becomes higher than that in the pressure line 42 and so opens the bypass valve 85 to permit fluid flow through the bypass passage 98 to return the working fluid to the fluid reservoir 24a of the master cylinder 24.

In the preferred construction, the pump pressure check valve 66, normally serving as a one-way check valve for preventing fluid flow from the electromagnetic valve 16a to the master cylinder 24, becomes wide-open in response to drop of the line pressure in the pressure line below a given pressure. This allows the fluid in the braking pressure line 46 to flow backwards through the electromagnetic valve 16a and the pump pressure check valve 66 to the master cylinder 24 via the pressure line 42. This function of the pump pressure check valve 66 facilitates full release of the braking pressure in the wheel cylinder 30a.

For instance, the bypass valve 85 is rated at a given set pressure, e.g. 2 kg/cm$^2$ and closes when the pressure difference between the pressure line 42 and the braking pressure line 46 drops below the set pressure. As a result, fluid pressure approximating the bypass valve set pressure tends to remain in the braking pressure line 46, preventing the wheel cylinder 30a from returning to the fully released position. In order to avoid this, in the shown embodiment, the one-way check valve function of the pump pressure check valve 66 is disabled when the line pressure in the pressure line 42 drops below a predetermined pressure, e.g. 10 kg/cm$^2$. When the line pressure in the pressure line 42 drops below the predetermined pressure, a bias force normally applied to the pump pressure check valve 66 is released, freeing the valve to allow fluid flow from the braking pressure line 46 to the master cylinder 24 via the pressure line 42.

HOLD MODE

In this control mode, a limited first value, e.g. 2 A of electric current servin as the control signal is applied to the actuator 16 to position the anchor closer to the actuator 16 than in the previous case. As a result, the inlet port 16b and the drain port 16d are closed to step fluid communication between the pressure line 42 and the braking pressure line 46 and between the braking pressure line and the drain passage 78. Therefore, the fluid pressure in the braking pressure line 46 is held at the level extant at the moment the actuator is operated by the control signal.

In this case, the fluid pressure applied through the master cylinder flows through the pressure check valve 66 to the pressure accumulator 70.

RELEASE MODE

In this control mode, a maximum value, e.g. 5 A of electric current serving as the control signal is applied to the actuator 16 to shift the anchor all the way toward the actuator 16. As a result, the drain port 16d is opened to establish fluid communication between the drain port 16d and the outlet port 16c. At this time, the fluid pump 90 serves to facilitate fluid flow from the braking pressure line 46 to the drain passage 78. The fluid flowing through the drain passage is partly accumulated in the fluid reservoir 76 and the remainder flows to the pressure accumulator 70 via the check valves 60 and 54 and the fluid pump 90.

It will be appreciated that, even in this release mode, the fluid pressure in the pressure line 42 remains at a level higher or equal to that in the braking pressure line 46, so that fluid flow from the braking pressure line 46 to the pressure line 42 via the bypass passage 98 and via the bypass check valve 85 will never occur.

In order to resume the braking pressure in the wheel cylinder (FL) 30a after once the braking pressure is reduced by positioning the electromagnetic valve 16a in the release position, the actuator 16 is again deenergized. The electromagnetic valve 16a is thus returns to its initial position to allow the fluid flow between the inlet port 16b and the outlet port 16c so that the pressurized fluid may flow to the left front wheel cylinder 30a via the braking pressure line 46. As set block the drain port 16d is closed to flock fluid flow from the pressure line 42 to the drain passage 78.

As a result, the pressure accumulator 70 is connected to the left front wheel cylinder 30a via the electromagnetic valve 16a and the braking pressure line 46. The pressurized fluid in the pressure accumulator 70 is thus supplied to the wheel cylinder 30a so as to resume the fluid pressure in the wheel cylinder 30a.

At this time, as the pressure accumulator 70 is connected to the fluid reservoir 76 via the check valves 60 and 54 which allow fluid flow from the fluid reservoir to the pressure accumulator, the extra amount of pressurized fluid may be supplied from the fluid reservoir.

The design of the wheel speed sensors 10, 12 and 14 employed in the preferred embodiment of the anti-skid control system will be described in detail with reference to FIGS. 7 to 9.

Figure 7:
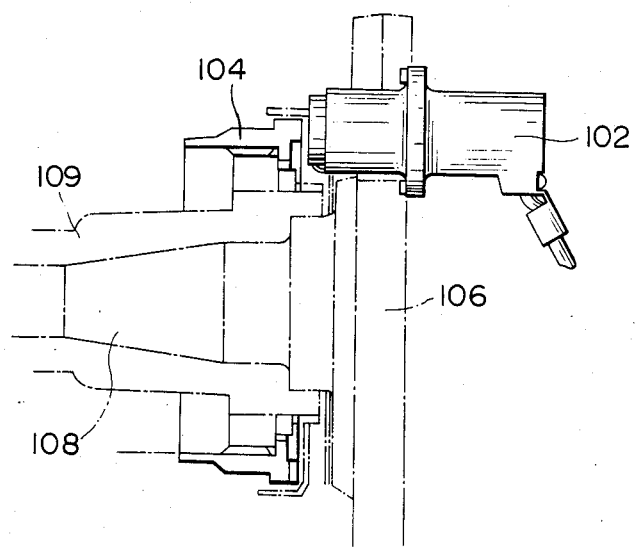
FIG. 7 is a perspective view of a wheel speed sensor adapted to detect the speed of a front wheel.

FIG. 7 shows the structure of the wheel speed sensor 10 for detecting the rate of rotation of the left front wheel. The wheel speed sensor 10 generally comprises a sensor rotor 104 adapted to rotate with the vehicle wheel, and a sensor assembly 102 fixedly secured to the shim portion 106 of the knuckle spindle 108. The sensor rotor 104 is fixedly secured to a wheel hub 109 for rotation with the vehicle wheel.

Figure 9:
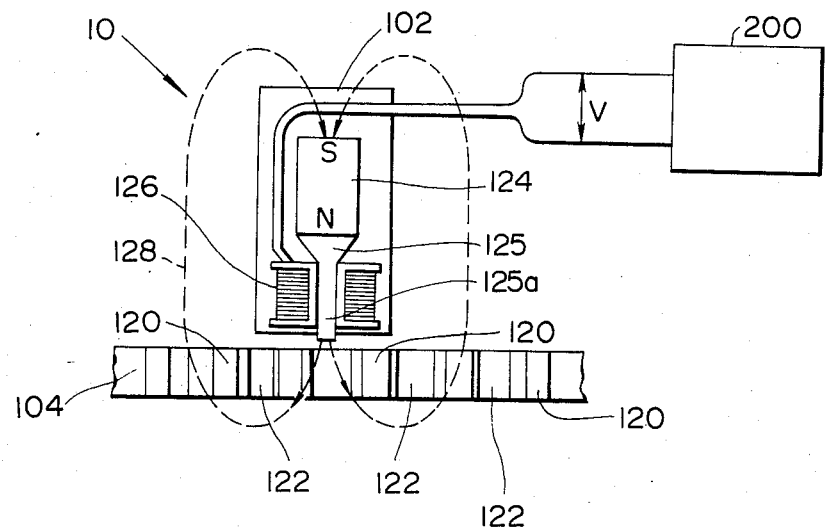
FIG. 9 is an explanatory illustration of the wheel speed sensors of FIGS. 7 and 8.
Figure 10:
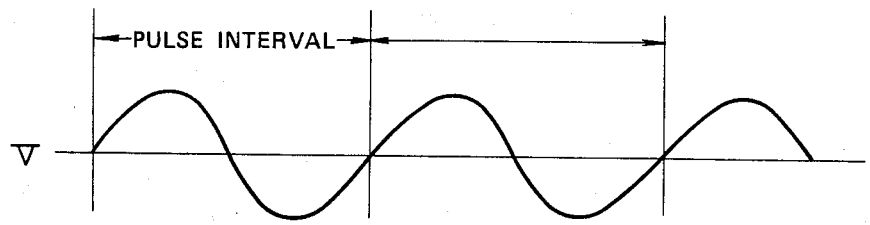
FIG. 10 shows the waveform of an alternating current sensor signal produced by the wheel speed sensor.

As shown in FIG. 9, the sensor rotor 104 is formed with a plurality of sensor teeth 120 at regular angular intervals. The width of the teeth 120 and the grooves 122 therebetween are equal in the shown embodiment and define a unit angle of wheel rotation. The sensor assembly 102 comprises a magnetic core 124 aligned with its north pole (N) near the sensor rotor 104 and its south pole (S) distal from the sensor rotor. A metal element 125 with a smaller diameter section 125a is attached to the end of the magnetic core 124 nearer the sensor rotor. The free end of the metal element 125 faces the sensor teeth 120. An electromagnetic coil 126 encircles the smaller diameter section 125a of the metal element. The electromagnetic coil 126 is adapted to detect variations in the magnetic field generated by the magnetic core 124 to produce an alternating-current sensor signal as shown in FIG. 10. That is, the metal element and the magnetic core 124 form a kind of proximity switch which adjusts the magnitude of the magnetic field depending upon the distance between the free end of the metal element 125 and the sensor rotor surface. Thus, the intensity of the magnetic field fluctuates in relation to the passage of the sensor teeth 120 and accordingly in relation to the angular velocity of the wheel.

It should be appreciated that the wheel speed sensor 12 for the right front wheel has the substantially the same structure as the set forth above. Therefore, explanation of the structure of the right wheel speed sensor 12 will be omitted in order to avoid unnecessary repetition in the disclosure and in order to simplify the description.

Figure 8:
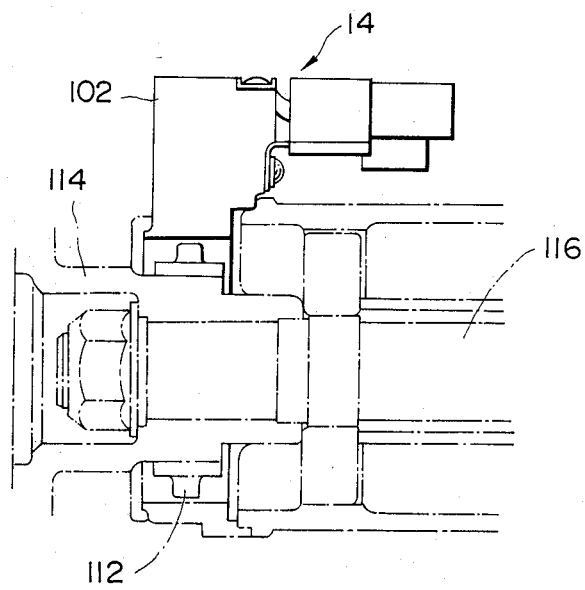
FIG. 8 is a side elevation of a wheel speed sensor adapted to detect the speed of a rear wheel.

FIG. 8 shows the structure of the rear wheel speed sensor 14. As with the aforementioned left front wheel speed sensor 10, the rear wheel speed sensor 14 comprises a sensor rotor 112 and a sensor assembly 102. The sensor rotor 112 is associated with a companion flange 114 which is, in turn, rigidly secured to a drive shaft 116 for rotation therewith. Thus, the sensor rotor 112 rotates with the drive shaft 116. The sensor assembly 102 is fixed to a final drive housing or a differential gear box (not shown).

Each of the sensor assemblies applied to the left and right front wheel speed sensors and the rear wheel sensor is adapted to output an alternating-current sensor signal having a frequency proportional to or corresponding to the rotational speed of the corresponding vehicle wheel. The electromagnetic coil 126 of each of the sensor assemblies 102 is connected to the control module 200 to supply the sensor signals thereto.

As set forth above, the control module 200 comprises the controller unit (FL) 202, the controller unit (FR) 204 and the controller unit (R) 206, each of which comprises a microcomputer. Therefore, the wheel speed sensors 10, 12 and 14 are connected to corresponding controller units 202, 204 and 206 and send their sensor signals thereto. Since the structure and operation of each of the controller units is substantially the same as that of the others, the structure and operation of only the controller unit 202 for performing the anti-skid brake control for the front left wheel cylinder will be explained in detail.

Figure 11:
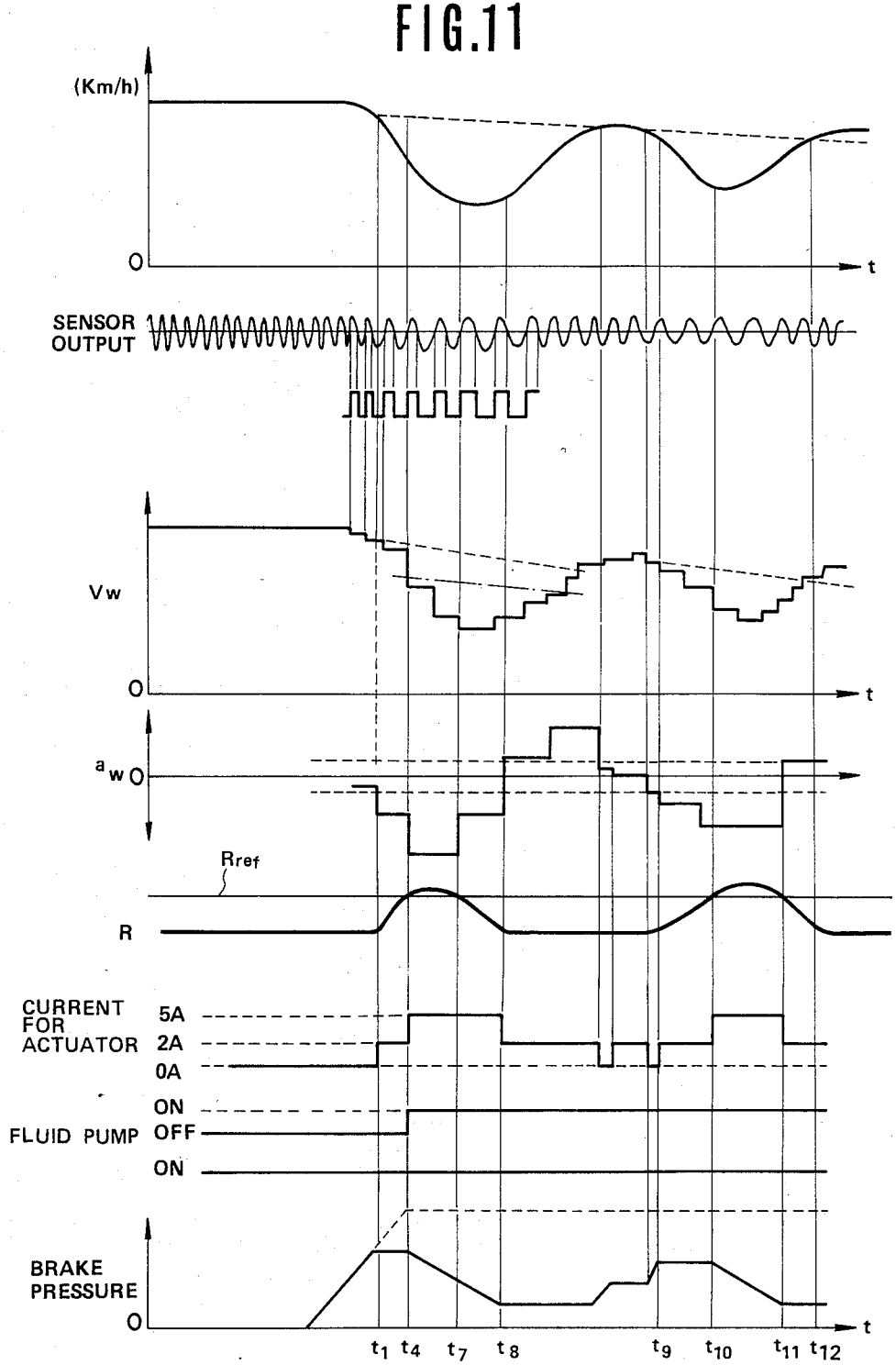
FIG. 11 is a timing chart for the anti-skid control system.

FIG. 11 is a timing chart of the anti-skid control performed by the controller unit 202. As set forth above, the alternating-current sensor signal output from the wheel speed sensor 10 is converted into a rectangular pulse train, i.e. as the sensor pulse signal mentioned above. The controller unit 202 monitors occurrences of sensor pulses and measures the intervals between individual pulse or between the first pulses of groups of relative-high-frequency pulses. Pulses are so grouped that the measured intervals will exceed a predetermined value, which value will be hereafter referred to as "pulse interval threshold".

The wheel rotation speed $V_w$ is calculated in response to each sensor pulse. As is well known, the wheel speed is generally inversely proportional to the intervals between the sensor pulses, and accordingly, the wheel speed $V_w$ is derived from the interval between the last sensor pulse input time and the current sensor pulse input time. A target wheel speed is designated $V_i$ and the resultant wheel speed is designated $V_w$. In addition, the slip rate is derived from the rate of change of the wheel speed and an projected speed $V_v$ which is estimated from the wheel speed at the moment the brakes are applied based on the assumption of a continuous, linear deceleration without slippage. In general, the target wheel speed $V_i$ is derived from the wheel speed of the last skid cycle during which the wheel deceleration rate was equal to or less than a given value which will be hereafter referred to as "deceleration threshold $a_{ref}$", and the wheel speed of the current skid cycle, and by estimating the rate of change of the wheel speed between wheel speeds at which the rate of deceleration is equal to or less than the deceleration threshold. In practice, the first target wheel speed $V_i$ is derived based on the projected speed $V_v$ which corresponds to a wheel speed at the initial stage of braking operation and at which wheel deceleration exceeds a predetermined value, e.g. $-1.2G$, and a predetermined deceleration rate, for example 0.4G. The subsequent target wheel speed $V_i$ is derived based on the projected speeds $V_v$ in last two skid cycles. For instance, the deceleration rate of the target wheel speed $V_i$ is derived from a difference between the projected speeds $V_v$ in the last two skid cycle and a period of time in which wheel speed varies from the first projected speed to the next projected speed. Based on the last projected speed and the deceleration rate, the target wheel speed in the current skid cycle is derived.

The acceleration and deceleration of the wheel is derived based on the input times of three successive sensor pulses. Since the interval between the adjacent sensor signal pulses corresponds to the wheel speed, and the wheel speed is a function of the reciprocal of the interval, by comparing adjacent pulse-to-pulse intervals, a value corresponding to the variation or difference between the wheel speed may be obtained. The resultant interval may be divided by the period of time of the interval in order to obtain the wheel acceleration and deceleration at the unit time. Therefore, the acceleration or deceleration of the wheel is derived from the following equation:

$$a_w = \left( \frac{1}{C-B} - \frac{1}{B-A} \right) / \left( \frac{C-A}{2} \right) \quad (1)$$

where A, B and C are the input times of the sensor pulses in the order given.

On the other hand, the slip rate R is a rate of difference between wheel speed relative to the vehicle speed which is assumed as substantially corresponding to the target wheel speed. Therefore, in the shown embodiment, the target wheel speed $V_i$ is taken as variable or parameter indicative of the assumed or projected vehicle speed. The slip rate R can be obtained by dividing a difference between the target wheel speed $V_i$ and the instantaneous wheel speed $V_w$ by the target wheel speed. Therefore, in addition, the slip rate R is derived by solving the following equation:

$$R = \frac{V_i - V_w}{V_i} \quad (2)$$

Finally, the controller unit 202 determines the control mode, i.e., release mode, hold mode and application mode from the slip rate R and the wheel acceleration or deceleration $a_w$.

General operation of the controller unit 202 will be briefly explained herebelow with reference to FIG. 11. Assuming the brake is applied as $t_0$ and the wheel deceleration $a_2$ exceeds the predetermined value, e.g. 1.2G at a time $t_1$, the controller unit 202 starts to operate at a time $t_1$. The first sensor pulse input time ($t_1$) is held in the controller unit 202. Upon receipt of the subsequent sensor pulse at a time $t_2$, the wheel speed $V_w$ is calculated by deriving the current sensor pulse period ($dt=t_2-t_1$). In response to the subsequently received sensor pulses at times $t_3, t_4 \ldots$, the wheel speed values $V_{w2}, V_{w3} \ldots$ are calculated.

On the other hand, at the time $t_1$, the instantaneous wheel speed is taken as the projected speed $V_v$. Based on the projected speed $V_v$ and the predetermined fixed value, e.g. 0.4G, the target wheel speed $V_i$ decelerating at the predetermined deceleration rate 0.4G is derived.

In anti-skid brake control, the braking force applied to the wheel cylinder is to be so adjusted that the peripheral speed of the wheel, i.e. the wheel speed, during braking is held to a given ratio, e.g. 85% to 80% of the vehicle speed. Therefore, the slip rate R has to be maintained below a given ratio, i.e., 15% to 10%. In the preferred embodiment, the control system controls the braking force so as to maintain the slip rate at about 15%. Therefore, a reference value $R_{ref}$ to be compared with the slip rate R is determined at a value at 85% of the projected speed $V_v$. As will be appreciated, the reference value is thus indicative of a slip rate threshold, which will be hereafter referred to "slip rate threshold $R_{ref}$" throughout the specification and claims, and varies according to variation of the target wheel speed.

Figure 4:
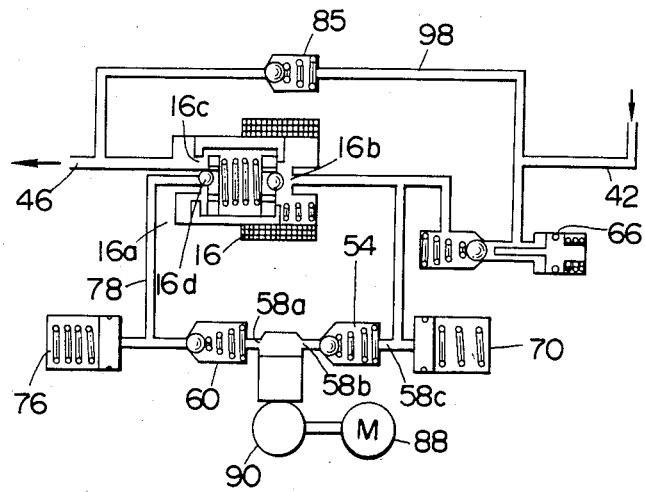
FIG. 4 is an illustration of the operation of an electromagnetic flow control valve employed in the hydraulic circuit, which valve has been shown in an application mode for increasing the fluid pressure in a wheel cylinder.
Figure 5:
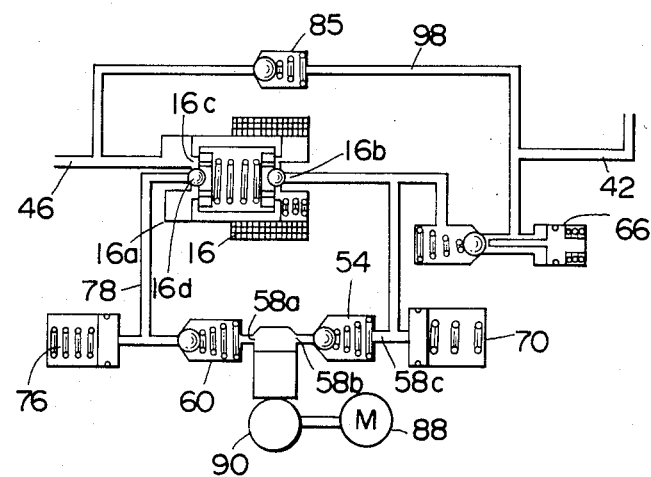
FIG. 5 is a view similar to FIG. 4 but of the valve in a hold mode in which the fluid pressure in the wheel cylinder is held at a substantially constant value.
Figure 6:
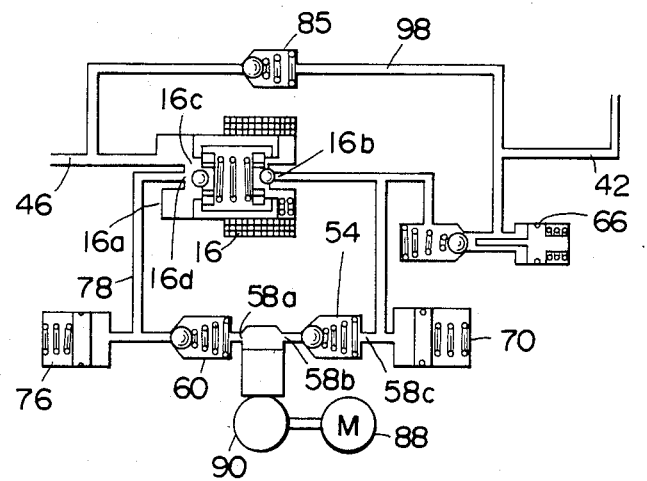
FIG. 6 is a view similar to FIG. 4 but of the valve in a release mode in which the fluid pressure in the wheel cylinder is reduced.

In practical brake control operation performed by the preferred embodiment of the anti-skid control system according to the present invention, the electric current applied to the actuator attains a limited value, e.g., 2 A to place the electromagnetic valve 30a in the hold mode as shown in FIG. 5 when the wheel speed remains inbetween the target wheel speed $V_i$ and the slip rate threshold $R_{ref}$. When the slip rate derived from the target wheel speed $V_i$ and the wheel speed $V_w$ becomes equal to or larger than the slip rate threshold $R_{ref}$, then the supply current to the actuator 16 is increased to a maximum value, e.g. 5 A to place the electromagnetic valve in the release mode as shown in FIG. 6. By maintaining the release mode, the wheel speed $V_w$ is recovered to the target wheel speed. When the wheel speed is thus recovered or resumed so that the slip rate R at that wheel speed becomes equal to or less than the slip rate threshold $R_{ref}$, then the supply current to the actuator 16 is dropped to the limited value, e.g. 2 A to return the electromagnetic valve 30a to the hold mode. By holding the reduced fluid pressure in the wheel cylinder, the wheel speed $V_w$ is further resumed to the target wheel speed $V_i$. When the wheel speed $V_w$ is resumed equal to or higher than the target wheel speed $V_i$, the supply current is further dropped to zero for placing the electromagnetic valve in the application mode as shown in FIG. 4. The electromagnetic valve 30a is maintained in the application mode until the wheel speed is decelerated at a wheel speed at which the wheel deceleration becomes equal to or slightly more than the deceleration threshold $R_{ref}$—1.2G. At the same time, the projected speed $V_y$ is again derived with respect to the wheel speed at which the wheel deceleration $a_w$ becomes equal to or slightly larger than the deceleration threshold $a_{ref}$. From a difference between speed of the last projected speed and the new projected speed and the period of time from a time obtaining the last projected speed to a time obtaining the new projected speed, a deceleration rate of the target wheel speed $V_i$ is derived. Therefore, assuming the last projected speed is $V_{v1}$, the new projected speed is $V_{v2}$, and the period of time is $T_v$, the target wheel speed $V_i$ can be obtained from the following equation:

$$V_i = V_{v2} - (V_{v1} - V_{v2})/T_v \times t_e$$

where $t_e$ is an elapsed time from the time at which the new projected speed $V_{v2}$ is obtained.

Based on the input timing $t_1, t_2, t_3, t_4 \ldots$, deceleration rate $a_w$ is derived from the foregoing equation (1). In addition, the projected speed $V_y$ is estimated as a function of the wheel speed $V_w$ and rate of change thereof. Based on the instantaneous wheel speeds $V_{w1}$ at which the wheel deceleration is equal to or less than the deceleration threshold $a_{ref}$ and the predetermined fixed value, e.g. 0.4G for the first skid cycle of control operation, the target wheel speed $V_i$ is calculated. According to equation (2), the slip rate R is calculated, using successive wheel speed values $V_{w1}, V_{w2}, V_{w3} \ldots$ as parameters. The derived slip rate R is compared with the slip rate threshold $R_{ref}$. As the wheel speed $V_w$ drops below the projected speed $V_y$ at the time $t_1$, the controller unit 202 switches the control mode from the application mode to the hold mode. Assuming also that the slip rate R exceeds the slip rate threshold at the time $t_4$, then the controller unit 202 switches the control mode to the release mode to release the fluid pressure at the wheel cylinder.

Upon release of the brake pressure in the wheel cylinder, the wheel speed $V_w$ recovers, i.e. the slip rate R drops until it is smaller than the slip rate threshold at time $t_7$. The controller unit 202 detects when the slip rate R is smaller than the slip rate threshold $R_{ref}$ and switches the control mode from release mode to the hold mode.

By maintaining the brake system in the hold mode in which reduced brake pressure is applied to the wheel cylinder, the wheel speed increases until it reaches the projected speed as indicated by the intersection of the dashed line ($V_y$) and the solid trace in the graph of $V_w$ in FIG. 11. When the wheel speed $V_w$ becomes equal to the target wheel speed V; (at a time $t_8$), the controller unit 202 switches the control mode from the hold mode to the application mode.

As can be appreciated from the foregoing description, the control mode will tend to cycle through the control modes in the order application mode, hold mode, release mode and hold mode, as exemplified in the period of time from $t_1$ to $t_8$. This cycle of variation of the control modes will be referred to hereafter as "skid cycle". Practically speaking, there will of course be some hunting and other minor deviations from the standard skid cycle.

The projected speed $V_y$, which is meant to represent ideal vehicle speed behavior, at time $t_1$ can be obtained directly from the wheel speed $V_w$ at that time since zero slip is assumed. At the same time, the deceleration rate of the vehicle will be assumed to be a predetermined fixed value or the appropriate one of a family thereof, in order to enable calculation of the target wheel speed for the first skid cycle operation. Specifically, in the shown example, the projected speed $V_y$ at the time $t_1$ will be derived from the wheel speed $V_{w1}$ at that time. Using the predetermined deceleration rate, the projected speed will be calculated at each time the wheel deceleration $a_w$ in the application mode reaches the deceleration threshold $a_{ref}$.

At time $t_9$, the wheel deceleration $a_w$ becomes equal to or slightly larger than the deceleration threshold $a_{ref}$, then the second projected speed $V_{v2}$ is obtained at a value equal to the instantaneous wheel speed $V_w$ at the time $t_9$. According to the above-mentioned equation, the deceleration rate da can be obtained $$da = (V_{v1} - V_{v2})/(t_9 - t_1)$$

Based on the derived deceleration rate da, the target wheel speed $V_i'$ for the second skid cycle of control operation is derived by:

$$V_i' = V_{v2} - da \times t_e$$

Based on the derived target wheel speed, the slip rate threshold $R_{ref}$ for the second cycle of control operation is also derived. As will be appreciated from FIG. 11, the control mode will be varied during the second cycle of skid control operation, to hold mode at time $t_9$ at which the wheel deceleration reaches the deceleration threshold $a_{ref}$ as set forth above, to release mode at time $t_{10}$ at which the slip rate R reaches the slip rate threshold $R_{ref}$, to hold mode at time $t_{11}$ at which the slip rate R is recovered to the slip rate threshold $R_{ref}$, and to application mode at time $t_{12}$ at which the wheel speed $V_w$ recovered or resumed to the target wheel speed $V_i'$. Further, it should be appreciated that in the subsequent cycles of the skid control operations, the control of the operational mode of the electromagnetic valve as set forth with respect to the second cycle of control operation, will be repeated.

Relating the above control operations to the structure of FIGS. 3 through 6, when application mode is used, no electrical current is applied to the actuator of the electromagnetic valve 16a so that the inlet port 16b communicates with the outlet port 16c, allowing fluid flow between the pressure passage 42 and the brake pressure line 46. A limited amount of electrical current (e.g. 2 A) is applied at times $t_1, t_7, t_9$ and $t_{11}$, so as to actuate the electromagnetic valve 16a to its limited stroke position by means of the actuator 16, and the maximum current is applied to the actuator as long as the wheel speed $V_w$ is not less than the projected speed and the slip rate is greater than the slip rate threshold $R_{ref}$. Therefore, in the shown example, the control mode is switched from the application mode to the hold mode at time $t_1$ and then to the release mode at time $t_4$. At time $t_7$, the slip rate increases back up to the slip rate threshold $R_{ref}$, so that the control mode returns to the hold mode, the actuator driving the electromagnetic valve 16a to its central holding position with the limited amount of electrical current as the control signal. When the wheel speed $V_w$ finally returns to the level of the target wheel speed $V_i$ at time $t_8$, the actuator 16 supply current is cut off so that the electromagnetic valve 16a returns to its rest position in order to establish fluid communication between the pressure line 42 and the braking pressure line 46 via inlet and outlet ports 16b and 16c.

Figure 12:
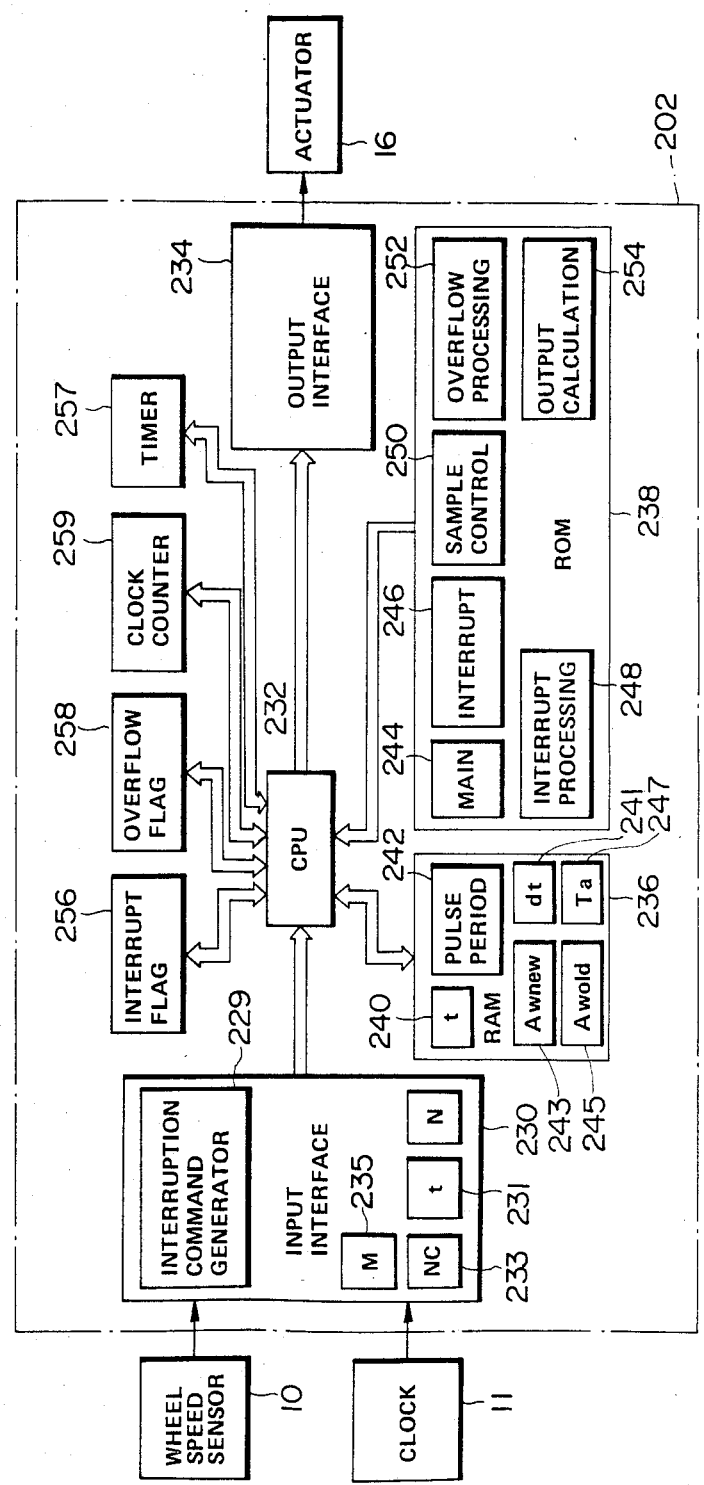
FIG. 12 is a step diagram of the preferred embodiment of a controller unit in the anti-skid brake control system according to the present invention.

Referring to FIG. 12, the controller unit 202 includes an input interface 230, CPU 232, an output interface 234, RAM 236 and ROM 238. The input interface 230 includes an interrupt command generator 229 which produces an interrupt command in response to every sensor pulse. In ROM, a plurality of programs including a main program (FIG. 13), an interrupt program (FIG. 15), an sample control program (FIG. 19), a timer overflow program (FIG. 20) and an output calculation program (FIG. 23) are stored in respectively corresponding address steps 244, 246, 250, 252 and 254.

The input interface also has a temporary register for temporarily holding input timing for the sensor pulses. RAM 236 similarly has a memory step holding input timing for the sensor pulses. The contents of the memory step 240 of RAM may be shifted whenever calculations of the pulse interval, wheel speed, wheel acceleration or deceleration, target wheel speed, slip rate and so forth are completed. One method of shifting the contents is known from the corresponding disclosure of the U.S. Pat. No. 4,408,290. The disclosure of the U.S. Pat. No. 4,408,290 is hereby incorporated by reference. RAM also has a memory step 242 for holding pulse intervals between the input sensor pulses. The memory step 242 is also adapted to shift the contents thereof according to the manner similar to set forth in the U.S. Pat. No. 4,408,290.

An interrupt flag 256 is provided in the controller unit 202 for signalling interrupt requests to the CPU. The interrupt flag 256 is set in response to the interrupt command from the interrupt command generator 229. A timer overflow interrupt flag 258 is adapted to set an overflow flag when the measured interval between any pair of monitored sensor pulses exceeds the capacity of a clock counter.

In order to time the arrival of the sensor pulses, a clock is connected to the controller unit 202 to feed time signals indicative of elapsed real time. The timer signal value is latched whenever a sensor pulse is received and stored in either or both of the temporary register 231 in the input interface 230 and the memory step 240 of RAM 236.

RAM further has memory steps 243 and 245 for storing wheel acceleration values $a_{wnew}$ and $a_{wold}$ respectively derived in the current and the immediate preceding calculations. The wheel acceleration and deceleration value derived in the current calculation will hereafter be referred to as "new wheel acceleration" and the wheel acceleration and deceleration derived in the immediate preceding calculation will hereafter be referred to as "old wheel acceleration". The memory step 245 is adapted to be updated by the contents of the memory step 243 as the old wheel acceleration $a_{wold}$ whenever the new wheel acceleration and decleration $a_w$ is derived. The memory step 243 is adapted to store the new wheel acceleration and deceleration $a_{wnew}$.

The controller unit 202 is also provided with a timer 257 which is adapted to measure the interval between successive wheel acceleration calculations. The timer value is latched when each new wheel acceleration and deceleration $a_w$ is derived and stored in a memory step 247 in RAM as a calculation interval indicative value $T_a$. The timer 257 is also reset when the timer value is written into the memory step 247.

The operation of the controller unit 202 and the function of each elements mentioned above will be described with reference to FIGS. 13 to 24.

Figure 13:
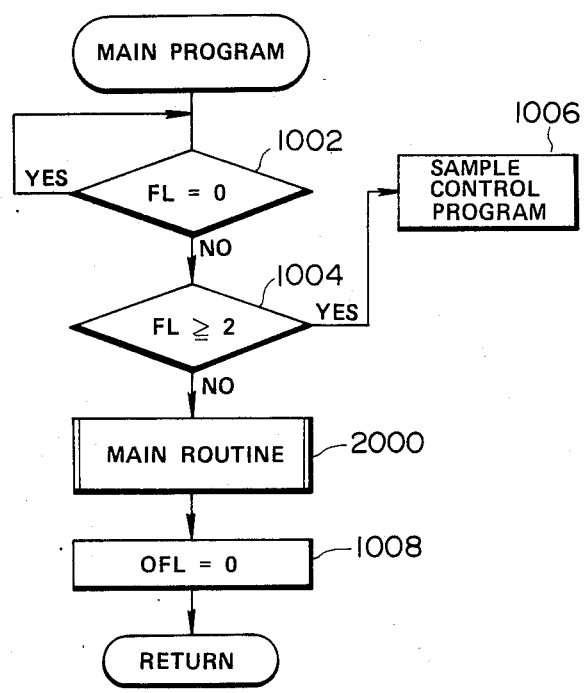
FIG. 13 is a flowchart of a main program of a microcomputer consisting the controller unit of FIG. 12.

FIG. 13 illustrates the main program for the anti-skid control system. Practically speaking, this program will generally be executed as a background job, i.e. it will have a lower priority than most other programs under the control of the same processor. Its first step 1002 is to wait until at least one sample period, covering a single sensor pulse or a group thereof, as described in more detail below, is completed as indicated when a sample flag FL has a non-zero value. In subsequent step 1004, the sample flag FL is checked for a value greater than one, which would indicate the sample period is too short. If this is the case, control passes to a sample control program labelled "1006" in FIG. 13 but shown in more detail in FIG. 19. If FL=1, then the control process is according to plan, and control passes to a main routine explained later with reference to FIG. 15. Finally, after completion of the main routine, a time overflow flag OFL is reset to signify successful completion of another sample processing cycle, and the main program ends.

Figure 14:
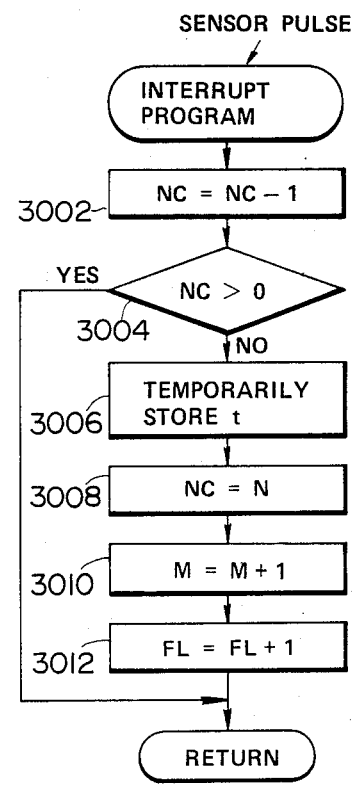
FIG. 14 is a flowchart of an interrupt program executed by the controller unit.

FIG. 14 shows the interrupt program stored in the memory step 246 of ROM 238 and executed in response to the interrupt command generated by the interrupt command generator 229 whenever a sensor pulse is received. It should be noted that a counter value NC of an auxiliary counter 233 is initially set to 1, a register N representing the frequency divider ratio is set at 1, and a counter value M of an auxiliary counter 235 is set at −1. After starting execution of the interrupt program, the counter value NC of the auxiliary counter 233 is decremented by 1 at a step 3002. The auxiliary counter value NC is then checked at a step 3004 for a value greater than zero. For the first sensor pulse, since the counter value NC is decremented by 1 (1−1=0) at the step 3002 and thus is zero, the answer o the step 3004 is NO. In this case, the clock counter value t is latched in a temporary register 231 in the input interface 230 at a step 3006. The counter value NC of the auxiliary counter 233 is thereafter assigned the value N in a register 235, which register value N is representive of frequency dividing ratio determined during execution of the main routine explained later, at a step 3008. The value M of an auxiliary counter 235 is then incremented by 1. The counter value M of the auxiliary counter 235 labels each of a sequence of sample periods covering an increasing number of sensor pulses. After this, the sample flag FL is incremented by 1 at a sstep 3012. After the step 3012, interrupt program ends, returning control to the main program or back to step 3002, whichever comes first.

On the other hand, when the counter value NC is non-zero when checked at the step 3004, this indicates that not all of the pulses for this sample period have been received, and so the interrupt program ends immediately.

This interrupt routine thus serves to monitor the input timing t of each pulse sampling period, i.e. the time t required to receive NC pulses, and signals completion of each sample period (M=0 through M=10, for example) for the information of the main program.

Before describing the operation in the main routine, the general method of grouping the sensor pulses into sample periods will be explained to facilitate understanding of the description of the operation in the main routine.

In order to enable the controller unit 202 to accurately calculate the wheel acceleration and deceleration $a_w$, it is necessary that the difference between the pulse intervals between the single or grouped sensor pulses exceeding a given period of time, e.g. 4 ms. In order to obtain the pulse interval difference exceeding the given period of time, 4 ms, which given period of time will be hereafter referred to as "pulse interval threshold S", some sensor pulses are ignored so that the recorded input timing t of the sensor pulse groups can satisfy the following formula:

$$dT = (C-B) - (B-A) \geq S(4 \text{ ms.}) \quad (3)$$

where A, B and C are the input times of three successive sensor pulse groups.

The controller unit 202 has different sample modes, i.e. MODE 1, MODE 2, MODE 3 and MODE 4 determining the number of sensor pulses in each sample period group. As shown in FIG. 16, in MODE 1 every sensor pulse input time is recorded and therefore the resigter value N is 1. In MODE 2, every other sensor pulse is ignored and the register value N is 2. In MODE 3, every fourth sensor pulse is monitored, i.e. its input time is recorded, and the register value N is 4. In MODE 4, every eighth sensor pulse is sampled and the register value N is then 8.

The controller unit 202 thus samples the input timing of three successive sensor pulses to calculate the pulse interval difference dT while operating in MODE 1. If the derived pulse interval difference is equal to or greater than the pulse interval threshold S, then sensor pulses will continue to be sampled in MODE 1. Otherwise, the input timing of every other sensor pulse is sampled in MODE 2 and from the sampled input timing of the next three sensor pulses sampled, the pulse interval difference dT is calculated to again be compared with the pulse interval threshold S. If the derived pulse interval difference is equal to or greater than the pulse interval threshold S, we remain in MODE 2. Otherwise, every four sensor pulses are sampled in MODE 3. The input timings of the next three sampled sensor pulses are processed to derive the pulse interval difference dT. The derived pulse interval difference dT is again compared with the pulse interval threshold S. If the derived pulse interval difference is equal to or greater than the pulse interval threshold S, the MODE remains at 3 and the value N is set to 4. On the other hand, if the derived pulse interval difference dT is less than the pulse interval threshold S, the mode is shifted to MODE 4 to sample the input timing of every eighth sensor pulse. In this MODE 4, the value N is set at 8.

Referring to FIG. 15, the main routine serves to periodically derive an updated wheel acceleration rate value $a_w$. In general, this is done by sampling larger and larger groups of pulses until the difference between the durations of the groups is large enough to yield an accurate value. In the main routine, the sample flag FL is reset to zero at a step 2001. Then the counter value M of the auxiliary counter 233, indicating the current sample period of the current $a_w$ calculation cycle, is read out at a step 2002 to dictate the subsequent program steps.

Specifically, after the first sample period (M=0), the input timing t temporarily stored in the temporary register 231 corresponding to the sensor pulse number (M=0) is read out and transferred to a memory step 240 of RAM at a step 2004, which memory step 240 will be hereafter referred to as "input timing memory". Then control passes to the step 1008 of the main program. When M=2, the corresponding input timing t is read out from the temporary register 231 and transferred to the input timing memory 240 at a step 2006. Then, at a step 2008, a pulse interval Ts between the sensor pulses of M=1 is derived from the two input timing values in the input timing memory 240. That is, the pulse interval between the sensor pulse (M=1) is derived by:

$$T_s = t_1 - t_0$$

where
$t_1$ is input time of the sensor pulse M1;
and
$t_0$ is input time of the sensor pulse M0.

The derived pulse interval $T_s$ of the sensor pulse M1 is then compared with the reference value, e.g. 4 ms., at a step 2010. If the pulse interval $T_s$ is shorter than the reference value, 4 ms., control passes to a step 2012 wherein the value N and the pulse interval $T_s$ are multiplied by 2. The doubled timing value ($2T_s$) is again compared with the reference value by returning to the step 2010. The steps 2010 and 2012 constitute a loop which is repeated until the pulse interval ($2nT_s$) exceeds the reference value. When the pulse interval ($2nT_s$) exceeds the reference value at the step 2010, a corresponding value of N (2N) is automatically selected. This N value represents the number of pulses to be treated as a single pulse with regard to timing.

After setting the value of N and thus deriving the sensor pulse group size then the auxiliary counter value NC is set to 1, at a step 2016. The register value N is then checked for a value of 1, at a step 2018. If N=1, then the auxiliary counter value M is set to 3 at a step 2020 and otherwise control returns to the main program. When the register value N equals 1, the next sensor pulse, which would normally be ignored, will instead be treated as the sensor pulse having the sample period number M=3.

In the processing path for the sample period number M=3, the corresponding input timing is read from the corresponding address of the temporary register 231 and transferred to the input timing memory 240, at a step 2024. The pulse interval $T_2$ between the sensor pulses at M=1 and M=3 is then calculated at a step 2026. The derived pulse interval $T_2$ is written in a storage section of a memory step 242 of RAM 236 for a current pulse interval data, which storage section will be hereafter referred at as "first pulse interval storage" and which memory step 242 will be hereafter referred to as "pulse interval memory". After the step 2026, control returns to the main program to await the next sensor pulse, i.e. the sensor pulse for sample period number M=4.

When the sensor pulse for M=4 is received, the value t of the temporary register 231 is read out and transferred to the input timing memory 240 at step 2028. Based on the input timing of the sensor pulses for M=3 and M=4, the pulse interval $T_3$ is calculated at a step 2030. The pulse interval $T_3$ derived at the step 2030 is then written into the first pulse interval storage of the pulse interval memory. At the same time, the pulse interval data $T_2$ previously stored in the first pulse interval storage is transferred to another storage section of the pulse interval memory adapted to store previous pulse interval data. This other storage section will be hereafter referred to as "second pulse interval storage". Subsequently, at a step 2032 the contents of the first and second storages, i.e. the pulse interval data $T_2$ and $T_3$ are read out. Based on the read out pulse interval data $T_2$ and $T_3$, a pulse interval difference dT is calculated at step 2032 and compared with the pulse interval threshold S to determine whether or not the pulse interval difference dT is large enough for accurate calculation of wheel acceleration or deceleration $a_w$. If so, process goes to the step 2040 to calculate the wheel acceleration or deceleration according to the equation (1). The register value N is then set to 1 at the step 2044 and thus MODE 1 is selected. In addition sample period number M is reset to $-1$, and the $a_w$ derivation cycle starts again. On the other hand, if at the step 2032 the pulse interval difference dT is too small to calculate the wheel acceleration or deceleration $a_w$, then the value N is multiplied by 2 at a step 2034. Due the updating of the value N, the sample mode of the sensor pulses is shifted to the next mode.

When the step 2034 is performed and thus the sample mode is shifted to MODE 2 with respect to the sensor pulse of $M=4'$, the sensor pulse $c_2$ input following to the sensor pulse of $M=4'$ is ignored. The sensor pulse $c_3$ following to the ignored sensor pulse $c_2$ is then taken as the sensor pulse to be sampled as $M=3''$. At this time, the sensor pulse of $M=4'$ is treated as the sensor pulse of $M=2''$ and the sensor pulse of $M=2$ is treated as the sensor pulse of $M=1''$. Therefore, calculation of the interval difference dT and discrimination if the derived interval difference dT is greater than the pulse interval threshold S in the step 2032 will be carried out with respect to the sensor pulse $c_3$ which will be treated as the sensor pulse of $M=4''$. The steps 2032 and 2034 are repeated until the interval difference greater than the pulse interval threshold S is obtained. The procedure taken in each cycle of repetition of the steps 2032 and 2034 is substantially same as that set forth above.

As set forth above, by setting the counter value NC of the auxiliary counter 233 to 1 at the step 2016, the input timing of the sensor pulse received immediately after initially deriving the sample mode at the steps 2010 and 2012 will be sampled as the first input timing to be used for calculation of the wheel acceleration and deceleration. This may be contrasted with the procedure taken in the known art.

FIG. 16 shows the wheel acceleration and deceleration deriving routine executed at the step 2040 of the main routine of FIG. 15. As set forth with respect to the step 2040, wheel acceleration and deceleration $a_w$ is calculated on the basis of three input timing values according to the equation (1). The calculation of wheel acceleration and deceleration is performed at a step 2040-1. Thereafter, the value $t_a$ of the timer 257 is latched and stored in the memory step 247 as timing data $T_a$, at a step 2040-2. At the same time, the timer 257 is reset and restarts measurement of elapsed time in order to measure the intervals between wheel acceleration calculations. Then, the new wheel acceleration and deceleration value $a_{wnew}$ stored in the memory step 243 is transferred to the memory step 245 and thus stored in the latter as old wheel acceleration and deceleration value $a_{wold}$, at a step 2040-3. Thereafter, the newly derived wheel acceleration and deceleration $a_w$ is written in the memory step 243 as new wheel acceleration and deceleration value $a_{wnew}$, at a step 2040-4.

Figure 19:
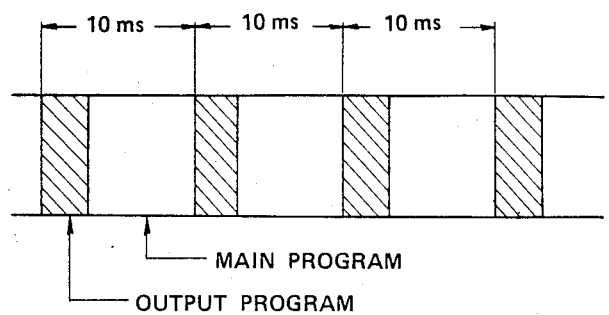
FIG. 19 is a timing chart of the execution timing of the output calculation program in relation to the execution timing of the main program.
Figure 20:
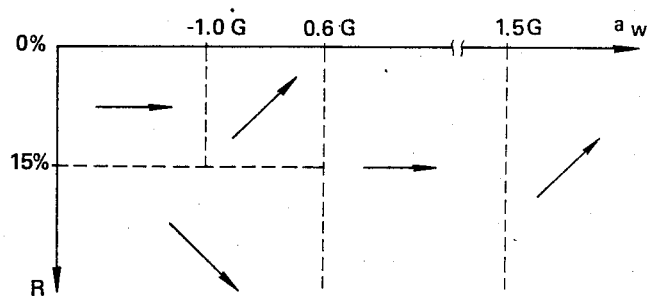
FIG. 20 is a table to be accessed in terms of the slip rate and the wheel acceleration and deceleration for determining control mode.
Figure 21:
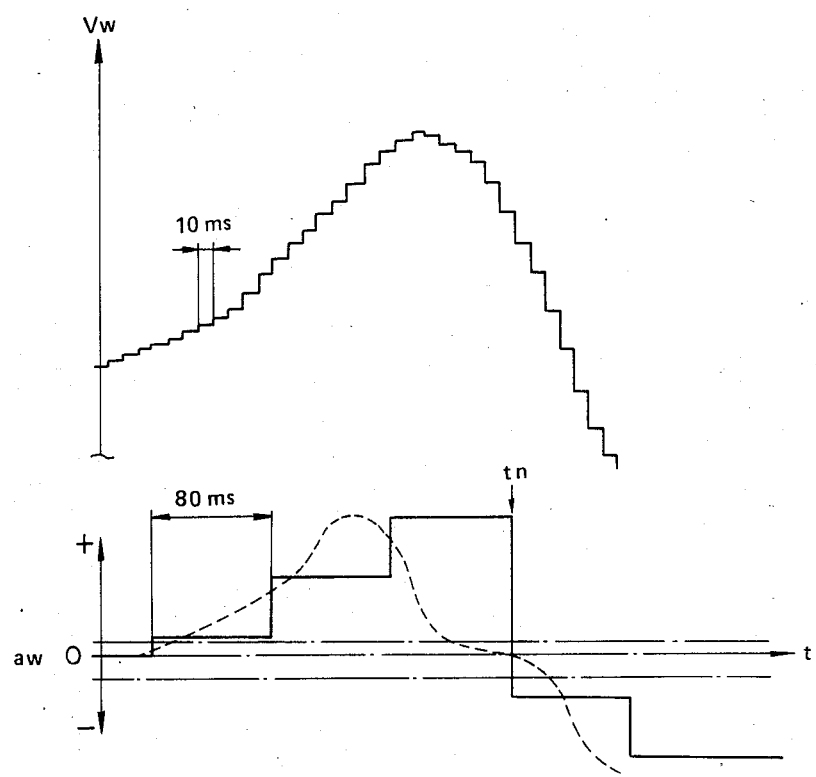
FIG. 21 shows the timing of calculation of wheel acceleration and deceleration in relation to the timing of calculation of wheel speed.
Figure 22:
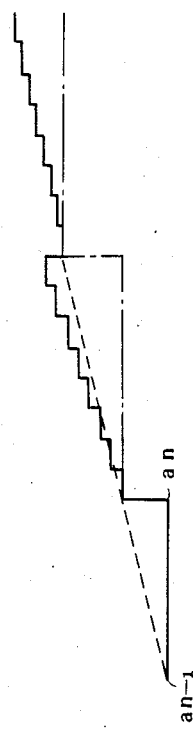
FIG. 22 shows the procedure of extrapolation of wheel acceleration and deceleration over one interval between calculation thereof.

FIG. 17 shows an output calculation program to be executed periodically, e.g., every 10 ms, as shown in FIG. 19. FIG. 18 shows an extrapolated value calculation routine in the output calculation program of FIG. 17. As can be seen in FIGS. 19 and 21, output calculation for deriving a control signal, i.e., EV and AV signals, is performed every 10 ms. On the other hand, calculation of wheel acceleration and deceleration $a_w$ is performed at a timing at which the difference between durations of successive groups of sensor signal pulses exceeds a predetermined period long enough to provide adequate resolution of wheel acceleration and deceleration. It is possible that the interval between wheel acceleration calculations could extend as long as approximately 80 ms. During the interval between calculations, the wheel acceleration and deceleration value will remain constant. However, during this wheel acceleration and deceleration calculation interval, the output calculation program may be performed more than once, i.e., as many as 8 times. In the output calculation program, wheel speed $V_w$, target wheel speed $V_i$, and slip rate R are derived and control mode is selected from a table shown in FIG. 20 in terms of the wheel acceleration and deceleration value $a_w$ and slip rate R. Generally, the slip rate R is derived from the wheel speed value $V_w$ and the target wheel speed value $V_i$, and will be different every time the output calculation program is executed.

As can be appreciated from FIG. 21, since the wheel acceleration and deceleration value $a_w$ would normally remain constant throughout the interval between wheel acceleration and deceleration calculations, the control mode would vary only with the slip rate R, even though the wheel acceleration and deceleration value $a_w$ is indeed changing continuously. This may possibly cause errors in selection of the control mode, causing one of the mode to be skipped.

In addition, when the interval between wheel acceleration and deceleration calculations is relatively long, the change in the values of the wheel acceleration and deceleration may become significant. This significant change in value over each interval between wheel acceleration and deceleration calculations may increase the probability of skipping one of the control mode.

For example, if at first the wheel acceleration and deceleration value $a_w$ is in the range of 0.6G to $-0.1$G and slip rate R is less than 15% when the first wheel acceleration value is derived, APPLICATION the MODE is selected. Then, wheel deceleration increases gradually to become less than $-0.1$G, calling the HOLD MODE. However, if the slip rate R becomes greater than 15% by the time the second wheel acceleration and deceleration which is less than $-0.1$G, is derived, the system may skip the HOLD MODE and go directly to the RELEASE MODE. This will shorten the period for which the braking pressure is maintained, which normally adjust the wheel speed toward the optimal relationship to the vehicle speed, i.e., at a slip rate of greater than 15%. This may degrade braking characteristics and expand braking distance.

Therefore, in accordance with the present invention, an extrapolated value is derived every time the output calculation program is executed so that wheel acceleration and deceleration values used in every control mode selection will vary gradually. The extrapolated value calculation will be described herebelow with reference to FIGS. 17 and 18.

As set forth, the output calculation program of FIG. 17 will be executed every 10 ms as interrupt program of the main program of FIG. 13.

In the output program the wheel speed $V_w$, wheel acceleration and deceleration $a_w$ and slip rate R are derived, and the operational mode, i.e. one of application mode, hold mode and release mode is selected, and an inlet signal EV and/or an outlet signal AV are derived depending upon the selected operation mode of the actuator 16.

When the application mode is selected the inlet signal EV goes HIGH and the outlet signal EV goes HIGH. When the release mode is selected, the inlet signal EV goes LOW and the outlet signal AV also goes LOW. When the selected mode is hold mode, the inlet signal EV remains HIGH while the outlet signal AV goes LOW. These combinations of the inlet signal EV and the outlet signal AV correspond to the actuator supply current levels shown in FIG. 11 and thus actuate the electromagnetic valve to the corresponding positions illustrated in FIGS. 4, 5 and 6.

The output program is stored in the memory step 254 and adapted to be read out periodically, e.g. every 10 ms, to be executed as an interrupt program. The output calculation program is executed in the time regions shown in hatching in FIG. 19.

During execution of the output calculation program, the pulse interval T is read out from a memory step 241 of RAM which stores the pulse interval, at a step 5002. As set forth above, since the pulse interval T is inversely proportional to the wheel rotation speed $V_w$, the wheel speed can be derived by calculating the reciprocal (1/T) of the pulse interval T. This calculation of the wheel speed $V_w$ is performed at a step 5004. After this, an extrapolating value $a_{wc}$ of wheel acceleration and deceleration $a_w$ is calculated at a step 5005 by executing of an extrapolating value deriving routine of FIG. 18.

In the extrapolating value $a_{wc}$ deriving routine, the wheel acceleration values $a_{wnew}$ and $a_{wold}$ stored in the memory steps 243 and 245 are read out at a step 5005-1. Then, the interval indicative value $T_a$ stored in the memory step 2047 is also read out at a step 5005-2. Based on the read out values $a_{wnew}$, $a_{wold}$ and $T_a$, the variation rate of the wheel acceleration and deceleration $da_w$ is calculated from the following equation:

$$da_w = (a_{wnew} - a_{wold})/T_a$$

at a step 5005-3. After this, the timer value $t_a$ is read out from the timer 257 at a step 5005-4. The variation rate $da_w$ derived at the step 5005-3 is then multiplied by the timer value $t_a$ to obtain the accumulated change in wheel acceleration over the period of time corresponding to the timer value $t_a$. Therefore, at a step 5005-5, the following equation is solved to obtain the extrapolating value $a_{wc}$:

$$a_{wc} = a_{wnew} + da_w \times t_a$$

After the step 5005-5, control returns to the output calculation program of FIG. 17.

After execution of the extrapolating value deriving routine of FIG. 18, target wheel speed $V_i$ is calculated at a step 5006. The method of deriving the target wheel speed $V_i$ has been illustrated in the U.S. Pat. Nos. 4,392,202 to Toshiro MATSUDA, issued on July 5, 1983, 4,384,330 also to Toshiro MATSUDA, issued on May 17, 1983 and 4,430,714 also to Toshiro MATSUDA, issued on Feb. 7, 1984, which are all assigned to the assignee of the present invention. The disclosure of the above-identified three U.S. Patents are hereby incorporated by reference for the sake of disclosure. As is obvious herefrom, the target wheel speed $V_i$ is derived as a function of wheel speed deceleration as actually detected. For instance, the wheel speed $V_w$ at which the wheel deceleration $a_w$ exceeds the deceleration threshold $a_{ref}$, e.g. −1.2G is taken as one reference point for deriving the target wheel speed $V_i$. The wheel speed at which the wheel deceleration $a_w$ also exceeds the deceleration threshold $a_{ref}$, is taken as the other reference point. In addition, the period of time between the points a and b is measured. Based on the wheel speed $V_{w1}$ and $V_{w2}$ and the measured period P, the deceleration rate $dV_i$ is derived from:

$$dV_i = (V_{w1} - V_{w2})/P \tag{4}$$

This target wheel speed $V_i$ is used for skid control in the next skid cycle.

It should be appreciated that, in the first skid cycle, the target wheel speed $V_i$ cannot be obtained. Therefore, for the first skid cycle, a predetermined fixed value will be used as the target wheel speed $V_i$.

At a step 5008 (FIG. 17), the slip rate R is calculated according to the foregoing formula (2). Subsequently, the operational mode is determined on the basis of the wheel acceleration and deceleration $a_w$ and the slip rate R, at a step 5010. FIG. 20 shows a table used in determining or selecting the operational mode of the actuator 16 and which is accessed according to the wheel acceleration and deceleration $a_w$ and the slip rate R. As can be seen, when the wheel slip rate R is in the range of 0 to 15%, the hold mode is selected when the wheel acceleration and deceleration $a_w$ is lower than −1.0G and the application mode is selected when the wheel acceleration and deceleration $a_w$ is in the range of −1.0G to 0.6G. On the other hand, when the slip rate R remains above 15%, the release mode is selected when the wheel acceleration and deceleration $a_w$ is equal to or less than 0.6G, and the hold mode is selected when the wheel acceleration and deceleration is in a range of 0.6G to 1.5G. When the wheel acceleration and deceleration $a_w$ is equal to or greater than 1.5G, the application mode is selected regardless of the slip rate.

According to the operation mode selected at the step 5010, the signal levels of the inlet signal EV and the outlet signal AV are determined so that the combination of the signal levels corresponds to the selected operation mode of the actuator 16. The determined combination of the inlet signal EV and the outlet signal AV are output to the actuator 16 to control the electromagnetic valve.

It should be appreciated that, although the execution timing of the output calculation program has been specified to be about 10 ms in the foregoing disclosure, the timing is not necessarily fixed to the mentioned timing and may be selectable from the approximate range of 1 ms to 20 ms. The execution timing of the output program is fundamentaly to be determined in accordance with the response characteristics of the actuator.

Figure 23:
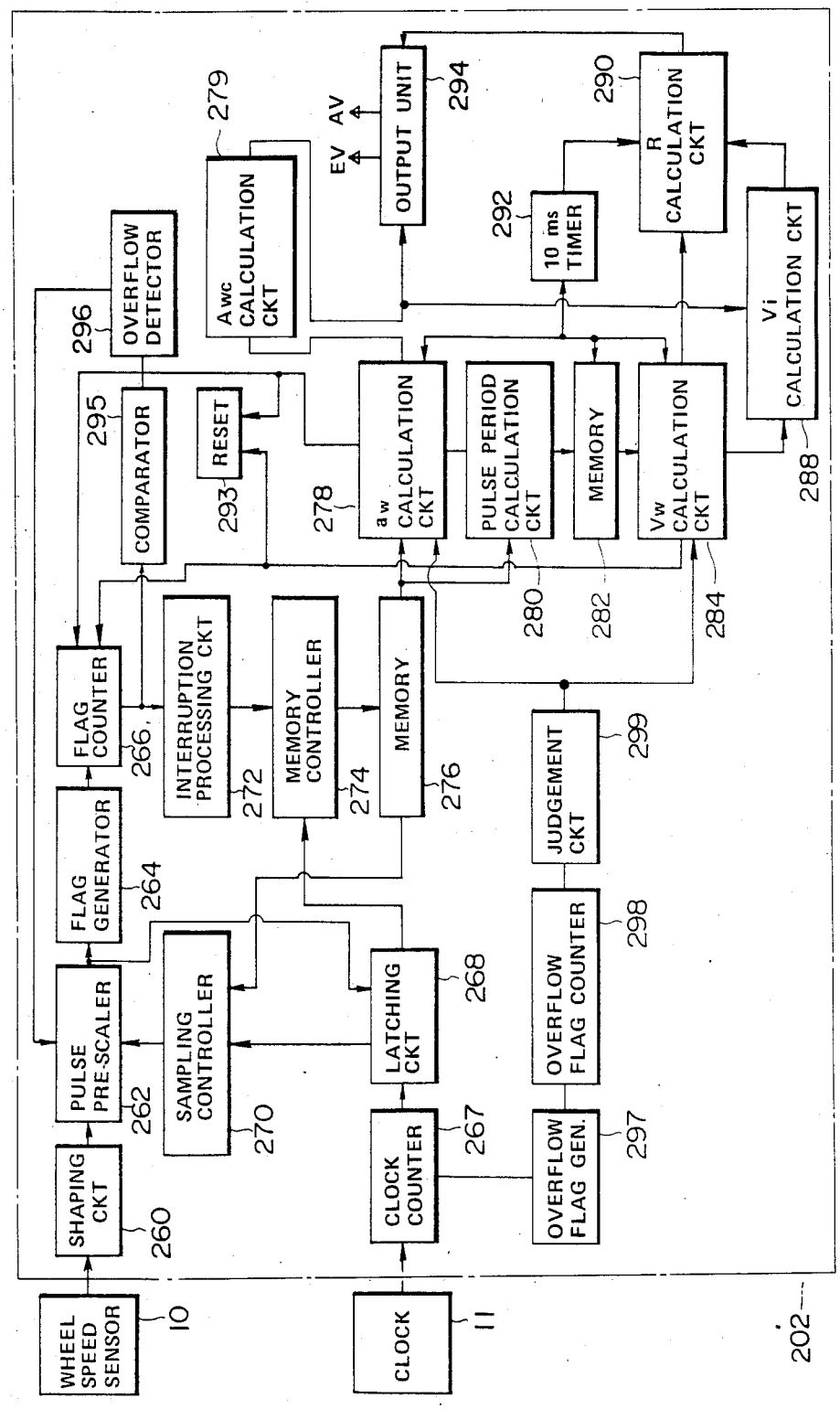
FIG. 23 is a step diagram of another embodiment of the anti-skid brake control system according to the present invention.

FIG. 23 shows another embodiment of the controller unit 202 in the preferred embodiment of the anti-skid control system according to the present invention. In practice, the circuit shown in FIG. 23 performs the same procedure in controlling the actuator 16 and each step of the circuit performs operation substantially corresponding to that performed by the foregoing computer flowchart.

In FIG. 23, the wheel speed sensor 10 is connected to a shaping circuit 260 provided in the controller unit 202. The shaping circuit 260 produces the rectangular sensor pulses having a pulse interval inversely proportional to the wheel speed $V_w$. The sensor pulse output from the shaping circuit 260 is fed to a pulse pre-scaler 262 which counts the sensor pulses to produce a sample command for sampling input timing when the counter value reaches a predetermined value. The predetermined value to be compared with the counter value in the pulse pre-scaler 262 is determined such that the intervals between the pairs of three successive sample commands will be sufficiently different to allow calculation of the wheel acceleration and deceleration rate.

The sample command is fed to a flag generator 264. The flag generator 264 is responsive to the sample command to produce a flag signal. The flag signal of the flag generator 264 is fed to a flag counter 266 which is adapted to count the flag signals and output a counter signal having a value representative of its counter value.

At the same time, the sample command of the pulse pre-scaler 262 is fed to a latching circuit 268 which is adapted to latch the signal value of a clock counter signal from a clock counter 267 counting the clock pulse output by a clock generator 11. The latched value of the clock counter signal is representative of the input timing of the sensor pulse which activates the pulse pre-scaler 262 to produce the sample command. The latching circuit 268 sends the input timing indicative signal having a value corresponding to the latched clock counter signal value, to a memory controller 274. The memory controller 274 is responsive to a memory command input from an interrupt processing circuit 272 which in turn is responsive to the flag counter signal to issue a memory command which activates the memory controller 274 to transfer the input timing indicative signal from the latching circuit 268 to a memory area 276. The memory 276 sends the stored input timing indicative signal to a sample controller 270 whenever the input timing signal value corresponding to the latched value of the latching circuit 268 is written therein. The sample controller 270 performs operations substantially corresponding to that performed in the steps 2008, 2010, 2012, 2032 and 2034 in FIG. 15, i.e. it determines number of sensor pulses in each group to be ignored. The sample controller 270 outputs a pulse number indicative signal to the pulse pre-scaler 262, which pulse number indicative signal has a value approximating the predetermined value to be compared with the counter value in the pulse pre-scaler 262.

The memory 276 also feeds the stored input timing indicative signal to a wheel acceleration and deceleration calculation circuit 278 and a pulse interval calculation circuit 280. The wheel acceleration and deceleration calculation circuit 278 first calculates a pulse interval difference between pairs of three successively sampled sensor pulses. The obtained pulse interval difference is compared with a reference value so as to distinguish whether the pulse interval difference is great enough to allow calculation of the wheel acceleration and deceleration $a_w$. If the obtained pulse interval difference is greater than the reference value, then the wheel acceleration and deceleration calculation circuit 278 performs calculation of the wheel acceleration and deceleration according to the above formula (1). The wheel acceleration and deceleration calculation circuit 278 is connected to an extrapolating value calculation circuit 279. The extrapolating value calculation circuit 279 is adapted to derive the rate of change of wheel acceleration and deceleration based on the derived wheel acceleration and deceleration values. The extrapolating value calculation circuit 279 also calculates an extrapolating value based on the derived variation rate and elapsed time. The procedure for deriving the extrapolating value is substantially the same as that described with respect to the first embodiment. The detailed construction of the extrapolating circuit will be described later with reference to FIG. 24.

If the obtained pulse interval difference is smaller than the reference value, the wheel acceleration and deceleration calculation circuit 278 shifts the operational mode thereof in a manner substantially corresponding to the procedure disclosed with reference to FIG. 16, so as to achieve a pulse interval difference large enough to permit the wheel acceleration and deceleration calculation. On the other hand, the pulse interval calculation circuit 280 performs calculations to obtain the pulse interval between the current pulse and the immediate preceding pulse and sends a pulse interval indicative signal to a memory 282. The memory 282 sends a stored pulse interval indicative signal to a wheel speed calculation circuit 284 which is associated with a 10 ms timer 292. The 10 ms timer 292 produces a timer signal every 10 ms to activate the wheel speed calculation circuit 284. The wheel speed calculation circuit 284 is responsive to the timer signal to perform calculation of the wheel speed $V_w$ by calculating the reciprocal value of the pulse interval indicative signal from the memory 282. The wheel speed calculation circuit 284 thus produces a wheel speed indicative signal to be fed to a target wheel speed calculation circuit 288 and to a slip rate calculation circuit 290 which is also associated with the 10 ms timer to be activated by the timer signal every 10 ms.

The target wheel speed calculation circuit 288 is adapted to detect the wheel speed $V_w$ at which the wheel acceleration and deceleration $a_w$ calculated by the wheel acceleration and deceleration calculating circuit 278 exceeds than a predetermined deceleration rate −b. The target wheel speed calculation circuit 288 measures the interval between times at which the wheel deceleration exceeds the predetermined deceleration value. Based on the wheel speed at the foregoing times and the measured period of time, the target wheel speed calculation circuit 288 derives a decelerating ratio of the wheel speed to produce a target wheel speed indicative signal. The target wheel indicative signal of the target wheel speed calculation circuit 288 and the wheel speed indicative signal from the wheel speed calculation circuit 284 are fed to a slip rate calculation circuit 290.

The slip rate calculation circuit 290 is also responsive to the timer signal from the 10 ms timer 292 to perform calculation of the slip rate R based on the wheel speed indicative signal from the wheel speed calculation circuit 284 and the target wheel speed calculation circuit 288, in accordance with the formula (2).

The slip rate calculation circuit 290 and the extrapolating value calculation circuit 279 are connected to an output unit 294 to feed the acceleration and deceleration indicative signal and the slip rate control signal thereto. The output unit 294 determines the operation mode of the actuator 16 based on the wheel acceleration and deceleration indicative signal value and the slip rate indicative signal value according to the table of FIG. 26. The output unit 294 thus produces the inlet and outlet signals EV and AV with a combination of signal levels corresponding to the selected operation mode of the actuator.

On the other hand, the wheel speed calculation circuit 284 is also connected to the flag counter 266 to feed a decrementing signal whenever the calculation of the wheel speed is completed and so decrement the counter value of the flag counter by 1. The flag counter 266 is also connected to a comparator 295 which is adapted to compare the counter value of the flag counter with a reference value, e.g. 2. When the counter value of the flag counter 266 is greater than or equal to the reference value, the comparator 295 outputs a comparator signal to an overflow detector 296. The overflow detector 296 is responsive to the comparator signal to feed a sample mode shifting command to be fed to the pulse pre-scaler 262 to shift the sample mode to increase the number of the sensor pulses in each sample group.

On the other hand, the clock counter 267 is connected to an overflow flag generator 297 which detects when the counter value reaches the full count of the clock counter to produce an overflow flag signal. The overflow flag signal of the overflow flag generator 297 is fed to an overflow flag counter 298 which is adapted to count the overflow flag signals and send an overflow counter value indicative signal to a judgment circuit 299. The judgment circuit 299 compares the overflow counter indicative signal value with a reference value e.g. 2. The judgment circuit 299 produces a reset signal when the overflow counter indicative signal value is equal to or greater than the reference value. The reset signal resets the wheel acceleration and deceleration calculation circuit 278 and the wheel speed calculation circuit 284 to zero. On the other hand, the overflow flag counter is connected to the wheel speed calculation circuit 284 and is responsive to the decrementing signal output from the wheel speed calculation circuit as set forth above to be reset in response to the decrementing signal.

As set forth above, according to the present invention, an anti-skid brake control system can sample the input timing of sensor pulses without error. In addition, as will be appreciated, the invention constructed as hereabove, fulfills all of the objects and advantages sought therefor.

Figure 24:
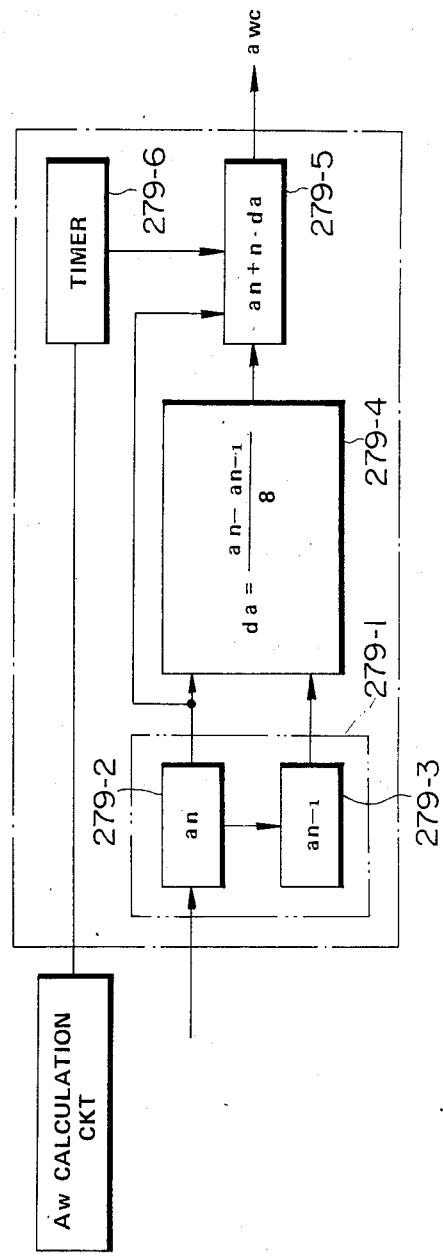
FIG. 24 is a step diagram of an extrapolating value calculation circuit in the anti-skid brake control system of FIG. 23.

FIG. 24 shows the detail of the extrapolating value calculation circuit 279 in the controller of FIG. 23. The extrapolating value calculation circuit 279 comprises a memory 279-1 including a first memory 279-2 adapted to store the new wheel acceleration and deceleration value and a second memory 279-3 which stores the old wheel acceleration and deceleration value. The content of the first memory 279-2 is transferred to the memory 279-3 whenever new wheel acceleration and deceleration value is derived. The wheel acceleration and deceleration value transferred to the memory 279-3 old wheel acceleration and deceleration value. On the other hand, the newly derived wheel acceleration and deceleration is stored in the memory 279-2 as the new wheel acceleration and deceleration value. The extrapolating value calculation circuit 279 also includes a timer 279-6 for measuring the period of time elapsed from the derivation of the new wheel acceleration value. The timer 279-6 is connected to the wheel acceleration and deceleration circuit 278 and responsive to the output of the latter to latch the timer value and restart measurement of elapsed time.

A first arithmetic circuit 279-4 reads out the stored values in the first and second memories 279-2 and 279-3, and the latched value in the timer 279-6. Based on the read values, the first arithmetic circuit 279-4 performs calculations for deriving the rate of change of wheel acceleration and deceleration according to the equation:

$$da_w = (a_{wnew} - a_{wold})/T_a.$$

The first arithmetic circuit 279-4 feeds the derived rate of change indicative signal to a second arithmetic circuit 279-5. The second arithmetic circuit 279-5 also receives the new wheel acceleration and deceleration value from the first memory 279-2 and the instantaneous timer value from the timer 279-6. Based on the new wheel acceleration and deceleration value $a_{wnew}$, the instantaneous timer value $t_a$ and the rate of change $da_w$, the second arithmetic circuit 279-5 performs calculation for deriving extrapolating value $a_{wc}$.

The derived extrapolating value $a_{wc}$ is fed to the output unit as a replacement for the wheel acceleration and deceleration value $a_w$ for use in deriving the operation mode.

As set forth above, according to the present invention, wheel acceleration and deceleration derived at a relatively long intervals can be satisfactorily and successfully estimated in order to prevent the control system from skipping one of the control modes.

Thus, the invention fulfills all of the objects and advantages sought therefor.

What is claimed is:

1. An anti-skid brake control system for an automotive hydraulic brake system comprising:

a hydraulic brake circuit including a wheel cylinder for applying braking pressure to a vehicle wheel and a pressure control valve disposed within said brake circuit for controlling hydraulic pressure to be applied to said wheel cylinder for adjusting braking pressure, said pressure control valve being operative to increase hydraulic pressure to be applied to the wheel cylinder in a first position thereof, and to decrease the hydraulic pressure in a second position thereof;

a wheel speed sensor for outputting sensor signal pulses separated by intervals, said intervals representative of detected wheel rotation speed;

a timer for outputting timer signals;

a first means for sampling values of the timer signals in response to input of said sensor signal pulses;

a second means, operative at a predetermined timing, for deriving wheel speed on the basis of sampled timer signal values;

a third means for deriving wheel acceleration or deceleration based on three sampled timer signal values of which the difference between the timed intervals between each pair of timer signal values is greater than a predetermined value;

a fourth means for deriving a control signal for controlling said pressure control valve on the basis of wheel speed and wheel acceleration or deceleration derived by said second and third means, so that wheel speed is held at an optimal relationship to vehicle speed; and fifth means for deriving the rate of change of wheel acceleration or deceleration on the basis of the two most recently derived values of wheel acceleration or deceleration from said third means, and deriving extrapolating value of wheel acceleration or deceleration based on said derived rate of change, and, said fifth means feeding said extrapolating value to said fourth means as a replacement of said wheel acceleration or deceleration from said third means during the time interval between successive wheel acceleration or deceleration calculations in said third means.

2. The anti-skid brake control system as set forth in claim 1, wherein said fourth means is activated at said predetermined timing in synchronism with operation of said second means.

3. The anti-skid brake control system as set forth in claim 1, wherein said fifth means is operative at said predetermined timing in synchronism with operation of said second means.

4. The anti-skid brake control system as set forth in claim 2, wherein said fifth means is operative at said predetermined timing in synchronism with operation of said second means.

5. The anti-skid brake control systems as set forth in claim 4, wherein said first means samples said timer signal values in response to the sensor signal pulses separated by an interval greater than a first predetermined value.

6. The anti-skid brake control system as set forth in claim 5, wherein said first means responds only to the first of a group of a given number of sensor signal pulses, the given number being so selected that the duration of the group is greater than said first predetermined value.

7. The anti-skid brake control system as set forth in claim 6, wherein said second means performs calculation for deriving wheel speed averaged over the duration of each group of sensor signal pulses.

8. The anti-skid brake control system as set forth in claim 7, wherein said third means selects the given number of sensor signal pulses to be grouped such that the difference between the time periods of successive groups is greater than a second predetermined value.

9. The anti-skid brake control system as set forth in claim 8, wherein said fifth means includes a memory for storing wheel acceleration values derived in immediate preceding and current calculations, as well as the derived rate of change.

10. The anti-skid brake control system as set forth in claim 9, wherein said memory is updated every time a new wheel acceleration value is derived.

11. A method for anti-skid controlling an automotive hydraulic brake system including a hydraulic brake circuit with a wheel cylinder for applying braking pressure to a vehicle wheel, and a pressure control valve operative to increase fluid pressure in said wheel cylinder in a first position thereof, and to decrease the fluid pressure in said wheel cylinder in a second position thereof to hold the fluid pressure in said wheel cylinder constant in a third position;
the method comprising the steps of:
detecting wheel rotation speed and producing a wheel speed indicative signal;
calculating wheel speed based on a value of the wheel speed indicative signal at a given first timing;
calculating wheel acceleration or deceleration data based on values of said wheel speed indicative signal at a second timing;
deriving an extrapolating value of wheel acceleration on the basis of the calculated wheel acceleration or deceleration at said first timing in synchronism with calculation of said wheel speed;
deriving a control signal to control said pressure control valve based on brake control variables including said wheel speed and said wheel acceleration and deceleration, which wheel acceleration or deceleration is replaced by said extrapolating value during the interval between successive wheel acceleration or deceleration calculations.

12. The method as set forth in claim 11, wherein the step of deriving the control signal is performed at said first timing in synchronism with said wheel speed calculation.

13. The method as set forth in claim 12, wherein said extrapolating value is derived from the wheel acceleration or deceleration data calculated in the current and the immediately preceding calculations.

14. The method as set forth in claim 13, wherein the step of deriving said extrapolating value includes a step of calculating the rate of change of wheel acceleration or deceleration over the interval between the current and the immediately preceding calculations.

* * * * *